(12) United States Patent
Kim

(10) Patent No.: US 11,937,320 B2
(45) Date of Patent: Mar. 19, 2024

(54) METHOD FOR MANAGING RADIO LINK IN MULTI-CARRIER ENVIRONMENT, AND DEVICE FOR SAME

(71) Applicant: ELECTRONICS AND TELECOMMUNICATIONS RESEARCH INSTITUTE, Daejeon (KR)

(72) Inventor: Jae Heung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 260 days.

(21) Appl. No.: 17/284,892

(22) PCT Filed: Oct. 24, 2019

(86) PCT No.: PCT/KR2019/014035
§ 371 (c)(1),
(2) Date: Apr. 13, 2021

(87) PCT Pub. No.: WO2020/085808
PCT Pub. Date: Apr. 30, 2020

(65) Prior Publication Data
US 2021/0385896 A1    Dec. 9, 2021

(30) Foreign Application Priority Data

Oct. 25, 2018 (KR) .......................... 10-2018-0128524
Dec. 14, 2018 (KR) .......................... 10-2018-0161974
Sep. 19, 2019 (KR) .......................... 10-2019-0115507

(51) Int. Cl.
*H04W 76/19*    (2018.01)
*H04W 36/00*    (2009.01)

(52) U.S. Cl.
CPC ....... *H04W 76/19* (2018.02); *H04W 36/0027* (2013.01)

(58) Field of Classification Search
None
See application file for complete search history.

(56) References Cited

U.S. PATENT DOCUMENTS 8,743,724 B2   6/2014   Kwon et al.
9,401,801 B1   7/2016   Park et al.
(Continued)

OTHER PUBLICATIONS

Lenovo et al., "Discussion of beam failure recovery for carrier aggregation", R1-1804211, 3GPP TSG RAN WG1 #92b, Sanya, China, Apr. 6, 2018.
(Continued)

*Primary Examiner* — Kenny S Lin
(74) *Attorney, Agent, or Firm* — LRK PATENT LAW FIRM

(57) ABSTRACT

A method for operating a terminal for radio link management includes: receiving from a first cell a connection reconfiguration message, for configuring carrier aggregation, including configuration information for a second cell; performing beam and radio link monitoring for the first and second cells; when a beam failure for the second cell is detected, performing at least one from among a procedure of reporting the beam failure to the first and second cells, a procedure of requesting the recovery of the beam failure from the first and second cells, and a beam recovery procedure for the second cell; receiving, from the first or second cell, a control message in response to the report of the beam failure, or in response to the beam recovery procedure; and, upon receiving the control message, determining whether the beam recovery procedure is successful.

14 Claims, 8 Drawing Sheets

(56) References Cited

U.S. PATENT DOCUMENTS

| | | | |
|---|---|---|---|
| 9,763,283 B2* | 9/2017 | Jung | H04W 76/15 |
| 9,769,717 B2 | 9/2017 | Park | |
| 10,009,952 B2 | 6/2018 | Kim | |
| 10,609,611 B2* | 3/2020 | Park | H04W 76/27 |
| 2012/0307811 A1 | 12/2012 | Kwon et al. | |
| 2015/0078184 A1* | 3/2015 | Lee | H04W 64/006 |
| | | | 370/252 |
| 2015/0092746 A1* | 4/2015 | Jang | H04W 36/0094 |
| | | | 370/331 |
| 2015/0163848 A1 | 6/2015 | Lin et al. | |
| 2015/0249930 A1* | 9/2015 | Andrianov | H04W 24/02 |
| | | | 455/423 |
| 2016/0007403 A1* | 1/2016 | Futaki | H04W 48/04 |
| | | | 370/338 |
| 2016/0044518 A1* | 2/2016 | Centonza | H04B 7/0408 |
| | | | 370/328 |
| 2017/0223690 A1 | 8/2017 | Zeng et al. | |
| 2018/0132197 A1 | 5/2018 | Lin et al. | |
| 2018/0139030 A1* | 5/2018 | Kim | H04W 72/20 |
| 2019/0053288 A1* | 2/2019 | Zhou | H04B 7/0626 |
| 2019/0053314 A1* | 2/2019 | Zhou | H04B 7/0695 |
| 2019/0082363 A1* | 3/2019 | Park | H04W 36/0055 |
| 2019/0089579 A1* | 3/2019 | Sang | H04W 36/00837 |
| 2019/0098520 A1* | 3/2019 | Kim | H04B 7/0404 |
| 2020/0084089 A1* | 3/2020 | Da Silva | H04W 24/08 |
| 2021/0314049 A1* | 10/2021 | Matsumura | H04W 24/10 |
| 2022/0006690 A1* | 1/2022 | Matsumura | H04L 41/0672 |

OTHER PUBLICATIONS

Mediatek Inc., "Revised Summary 1 on Remaing issues on Beam Failure Recovery", R1-1805583, 3GPP TSG RAN WG1 #92bis, Sanya, China, Apr. 18, 2018.

Nokia et al., "Remaining issues on beam management", R1-1809237, 3GPP TSG RAN WG1 #94, Gothenburg, Sweden, Aug. 10, 2018.

Interdigital Inc., "Random access in NR-Unlicensed", R2-1809613, 3GPP TSG RAN WG2 #AH, Montreal, Canada, Jun. 22, 2018.

Samsung, "General aspects for NR-U", R2-1808653, 3GPP TSG RAN WG2 #102, Busan, Korea, May 11, 2018.

Search Report, dated Feb. 5, 2020, for International Application No. PCT/KR2019/014035.

Written Opinion, dated Feb. 5, 2020, for International Application No. PCT/KR2019/014035.

* cited by examiner

METHOD FOR MANAGING RADIO LINK IN MULTI-CARRIER ENVIRONMENT, AND DEVICE FOR SAME

CROSS-REFERENCE TO RELATED APPLICATIONS

The present application is a U.S. National Phase entry from International Application No. PCT/KR2019/014035, filed Oct. 24, 2019, which claims priority to Korean Patent Application Nos. 10-2018-0128524, filed Oct. 25, 2018, 10-2018-0161974, Dec. 14, 2018, and 10-2019-0115507, filed Sep. 19, 2019, the disclosure of which is incorporated by reference herein in their entirety.

TECHNICAL FIELD

The present invention relates to a method and an apparatus for radio link management in a multi-carrier environment, and more particularly, to methods and apparatuses for mobility support and radio link establishment/management in a mobile communication system environment supporting carrier aggregation functionality, which uses a high frequency band above a millimeter wave band.

BACKGROUND ART

In order to cope with the explosion of wireless data, a mobile communication system considers a 6 GHz to 90 GHz band as a transmission frequency for a wide system bandwidth. In such the high frequency band, it is assumed that a small base station is used due to deterioration of received signal performance due to attenuation and reflection of radio waves.

In order to deploy the mobile communication system based on small base stations each having a small service coverage, considering a millimeter frequency band of 6 GHz to 90 GHz band, instead of implementing radio protocol functions of the mobile communication system in each small base station, considered is a method of configuring the mobile communication system by utilizing a plurality of transmission and reception points (TRPs) through a functional split scheme, in which the base station functions are divided into a plurality of remote radio transmission and reception blocks and one centralized baseband processing function block, or a carrier aggregation function.

In the mobile communication system employing such the functional split or carrier aggregation function, mobility function support and radio link establishment and management functions are required to guarantee service continuity in radio interfaces for a backhaul connecting a base station and a core network, and a fronthaul connecting the remote radio transmission and reception blocks (e.g., TRPs, Remote Radio Heads (RRHs), etc.) and the baseband processing block, as well as an access link between the base station and terminals.

DISCLOSURE

Technical Problem

An objective of the present invention for solving the above-described problem is directed to providing a method for mobility support and radio link management in a mobile communication system environment supporting carrier aggregation, which uses a high frequency band above a millimeter wave band.

Another objective of the present invention for solving the above-described problems is directed to providing an apparatus for mobility support and radio link management in a mobile communication system environment supporting carrier aggregation, which uses a high frequency band above a millimeter wave band.

Technical Solution

An exemplary embodiment of the present invention for achieving the above-described objective, as an operation method of a terminal for radio link management, may comprise receiving, from a first cell operating as a primary cell (PCell), a connection reconfiguration message for configuring a carrier aggregation function including configuration information for a second cell operating as a secondary cell (SCell); performing beam and radio link monitoring operations for the first cell and the second cell; in response to detecting a beam problem or failure for the second cell, performing at least one of a procedure of reporting the beam problem or failure for the second cell to the first cell and the second cell, a procedure of requesting recovery of the beam problem or failure for the second cell to the first cell and the second cell, and a beam recovery procedure with the second cell; receiving a control message from the first cell or the second cell in response to the reporting of the beam problem or failure for the second cell or in response to the beam recovery procedure; and determining, according to reception of the control message, whether the beam recovery procedure is successful.

The beam problem or failure may be reported to the first cell and the second cell together with identification information of a beam from which the beam problem or failure is detected and information on a time elapsed from a time point when the beam problem or failure is detected.

The beam problem or failure may be reported through transmission of a control field of a physical layer uplink control channel (PUCCH), transmission of a separate physical layer signal, or transmission of a random access preamble, which uses an uplink active bandwidth part (BWP).

The control field of the PUCCH, the separate physical layer signal, or the random access preamble may be configured for each of the first cell and the second cell.

The beam problem or failure may be directly reported from the terminal to the first cell, or reported from the terminal to the first cell through the second cell or another secondary cell other than the second cell.

The control message may be received through a control message of a medium access control (MAC) layer, a control message of a radio resource control (RRC) layer, a physical layer control channel, or a random access response (RAR) message.

The control message may include at least one of information indicating a change to another beam, information indicating a newly activated beam, information configuring a new beam, and information indicating a change of an active BWP.

The beam recovery procedure may be performed by transmitting a random access preamble to the first cell or the second cell, or by transmitting a message for requesting a beam change to the first cell, another secondary cell capable of receiving uplink transmission other than the second cell, or the second cell that has successfully received the random access preamble.

The random access preamble may be a non-contention-based random access preamble specified in the connection reconfiguration message.

When the random access preamble is a contention-based random access preamble, a contention-based random access preamble of the first cell may be preferentially configured as the random access preamble, or when a random access resource is not configured in an uplink active BWP, a contention-based random access preamble of a cell configured as an initial BWP may be preferentially configured as the random access preamble.

The random access preamble may be a non-contention-based random access preamble when a reception strength of a reference signal or a synchronization signal received through a beam in which the beam problem or failure is declared is greater than or equal to a reference value, and the random access preamble may be a contention-based random access preamble when the reception strength of the reference signal or the synchronization signal received through the beam in which the beam problem or failure is declared is less than a reference value.

The message for requesting the beam change may be reported through transmission of a control field of a PUCCH, transmission of a separate physical layer signal, or transmission of a random access preamble, which uses an uplink active BWP.

Another exemplary embodiment of the present invention for achieving the above-described objective, as an operation method of a terminal for radio link management, may comprise configuring a connection with a first cell; determining whether feedback information or a physical downlink control channel (PDCCH) for uplink transmission to the first cell is received from the first cell according to a preconfigured condition; in response to determining that the feedback information or the PDCCH is not received according to the preconfigured condition, starting an uplink polling timer (UL_POLL_TIMER) and transmitting an uplink polling message to the first cell; in response to receiving an uplink polling response message or a downlink polling message for the uplink polling message from the first cell before the uplink polling timer expires, determining that a beam or radio link with the first cell is valid; and in response to not receiving the uplink polling response message or the downlink polling message for the uplink polling message from the first cell before the uplink polling timer expires, declaring a failure of the beam or radio link with the first cell.

The operation method may further comprise, when the failure of the beam or radio link with the first cell is declared, performing a beam recovery procedure with the first cell or stopping uplink transmission to the first cell for a preconfigured time.

The operation method may further comprise, when the failure of the beam or radio link with the first cell is declared, reporting the failure of the beam or radio link or requesting deactivation of the first cell through a second cell.

Yet another exemplary embodiment of the present invention for achieving the above-described objective, as an operation method of a base station operating a primary cell (PCell) for radio link management, may comprise transmitting, to a terminal, a connection reconfiguration message for configuring a carrier aggregation function including configuration information on a second cell operating as a secondary cell (SCell); in response to detecting a beam problem or failure for the second cell in the terminal, performing a procedure of receiving a report of the beam problem or failure for the second cell from the terminal and/or a procedure of receiving a request of a beam recovery procedure for the second cell from the terminal; and transmitting a control message to the terminal in response to the report of the beam problem or failure for the second cell or the beam recovery procedure. The beam problem or failure may be reported from the terminal together with identification information of a beam from which the beam problem or failure is detected and information on a time elapsed from a time point when the beam problem or failure is detected.

The beam problem or failure may be reported through transmission of a control field of a physical layer uplink control channel (PUCCH), transmission of a separate physical layer signal, or transmission of a random access preamble, which uses an uplink active bandwidth part (BWP), and the control field of the PUCCH, the separate physical layer signal, or the random access preamble may be configured for each of the first cell and the second cell.

The beam problem or failure may be directly reported from the terminal to the first cell, or reported from the terminal to the first cell through the second cell or another secondary cell other than the second cell.

The beam recovery procedure may be performed by receiving a random access preamble from the terminal, performed by receiving a message for requesting a beam change from the terminal, or performed by receiving a message for requesting a beam change through another secondary cell capable of receiving uplink transmission of the terminal other than the second cell or the second cell that has successfully received the random access preamble.

Advantageous Effects

According to the exemplary embodiments of the present invention, in an Xhaul network composed of wireless backhaul and fronthaul and an access link between the user terminals and the base station, efficient mobility controls and signaling procedures for the wireless terminal or user terminal, which is mounted on a moving object such as an unmanned aerial vehicle, train, autonomous vehicle, and car using a navigation device, can be provided. Therefore, in the mobile communication system, mobility support and radio link management functions for guaranteeing service continuity can be provided.

MODES OF THE INVENTION

Figure 1:
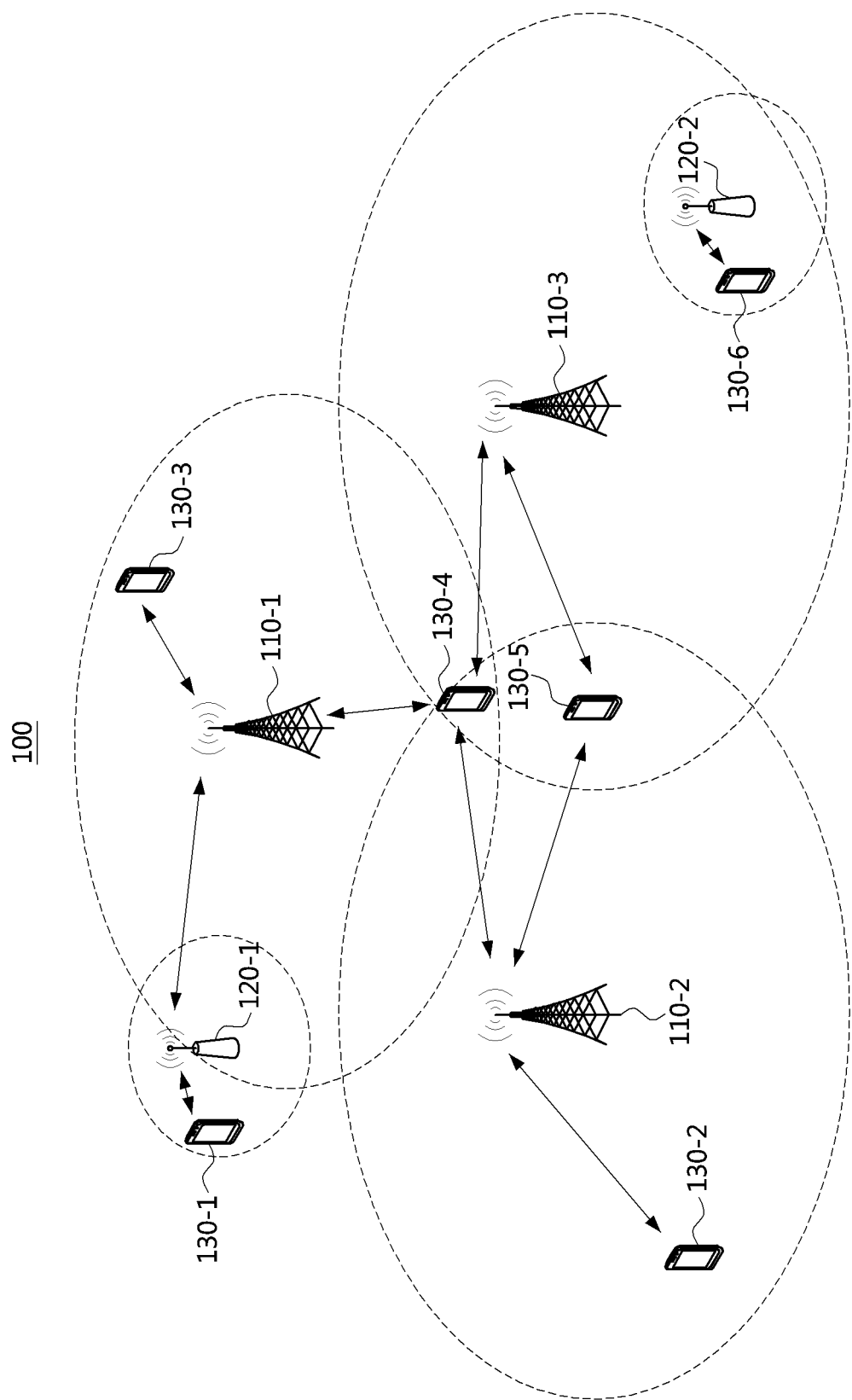
FIG. 1 is a conceptual diagram illustrating a first exemplary embodiment of a wireless communication network.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A wireless communication network to which exemplary embodiments according to the present invention are applied will be described. The wireless communication network to which exemplary embodiments according to the present invention are applied is not restricted to what will be described below. That is, the exemplary embodiments according to the present invention may be applied to various wireless communication networks. Here, the wireless communication network may be used with the same meaning as a wireless communication system.

FIG. 1 is a conceptual diagram illustrating a first exemplary embodiment of a wireless communication network.

Referring to FIG. 1, a wireless communication network 100 may comprise a plurality of communication nodes 110-1, 110-2, 110-3, 120-1, 120-2, 130-1, 130-2, 130-3, 130-4, 130-5, and 130-6. Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a space division multiple access (SDMA) based communication protocol, or the like. Each of the plurality of communication nodes may have the following structure.

Figure 2:
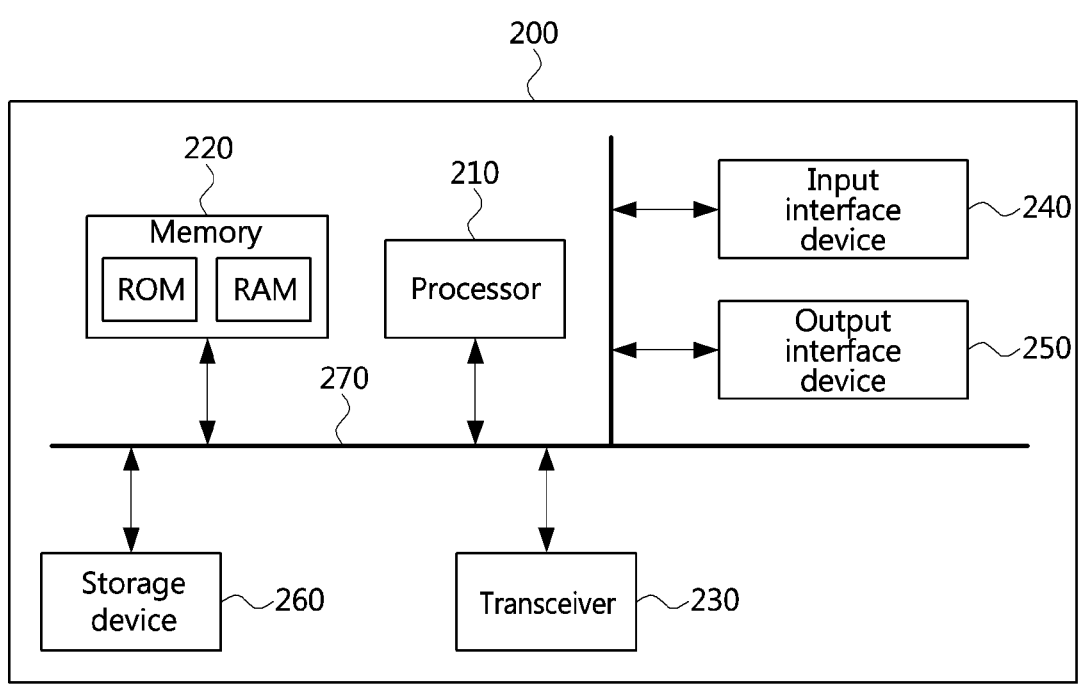
FIG. 2 is a block diagram illustrating a first exemplary embodiment of a communication node constituting a wireless communication network.

FIG. 2 is a block diagram illustrating a first exemplary embodiment of a communication node constituting a wireless communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the wireless communication network 100 may comprise a plurality of base stations 110-1, 110-2, 110-3, 120-1, and 120-2, and a plurality of user equipments (UEs) 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third UE 130-3, and the fourth UE 130-4 may belong to cell coverage of the first base station 110-1. The second UE 130-2, the fourth UE 130-4, and the fifth UE 130-5 may belong to cell coverage of the second base station 110-2. Also, the fifth base station 120-2, the fourth UE 130-4, the fifth UE 130-5, and the sixth UE 130-6 may belong to cell coverage of the third base station 110-3. The first UE 130-1 may belong to cell coverage of the fourth base station 120-1. The sixth UE 130-6 may belong to cell coverage of the fifth base station 120-2.

Here, each of the plurality of base stations 110-1, 110-2, 110-3, 120-1 and 120-2 may refer to a node B (NodeB), an evolved NodeB (eNB), a base transceiver station (BTS), a radio base station, a radio transceiver, an access point, an access node, or the like. Each of the plurality of UEs 130-1, 130-2, 130-3, 130-4, 130-5 and 130-6 may refer to a terminal, an access terminal, a mobile terminal, a station, a subscriber station, a mobile station, a portable subscriber station, a node, a device, or the like.

Each of the plurality of communication nodes 110-1, 110-2, 110-3, 120-1, 120-2, 130-1, 130-2, 130-3, 130-4, 130-5, and 130-6 may support a cellular communication (e.g., long term evolution (LTE), LTE-A (advanced), etc. defined in the 3rd generation partnership project (3GPP) standard), or wireless protocol specifications of mmWave (e.g., 6 GHz to 80 GHz band) based wireless access technology. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network (not shown) through the ideal or non-ideal backhaul. Each of the plurality of base stations 110-1, 110-2, 110-3, 120-1, and 120-2 may transmit a signal received from the core network to the corresponding UE 130-1, 130-2, 130-3, 130-4, 130-5, or 130-6, and transmit a signal received from the corresponding UE 130-1, 130-2, 130-3, 130-4, 130-5, or 130-6 to the core network.

Figure 3:
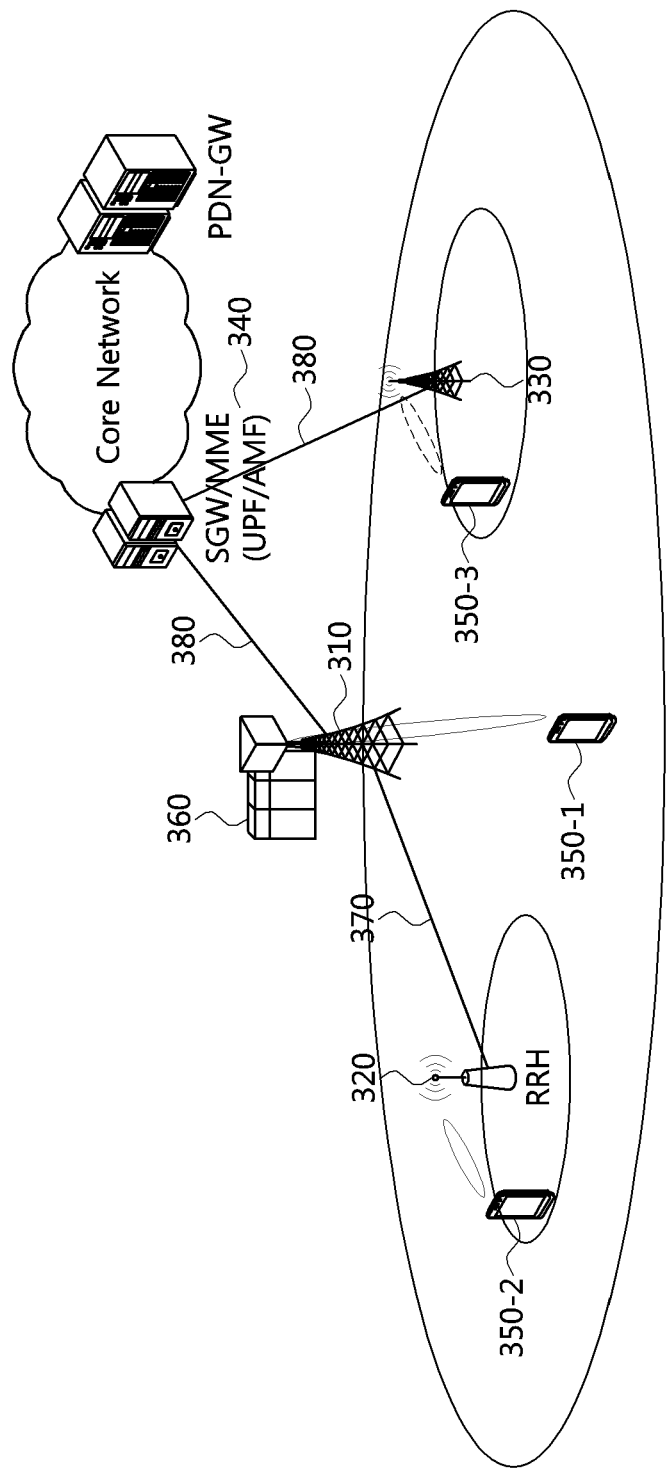
FIG. 3 is a conceptual diagram for explaining a structure of a mobile communication network to which exemplary embodiments of the present invention are applied.
Figure 4:
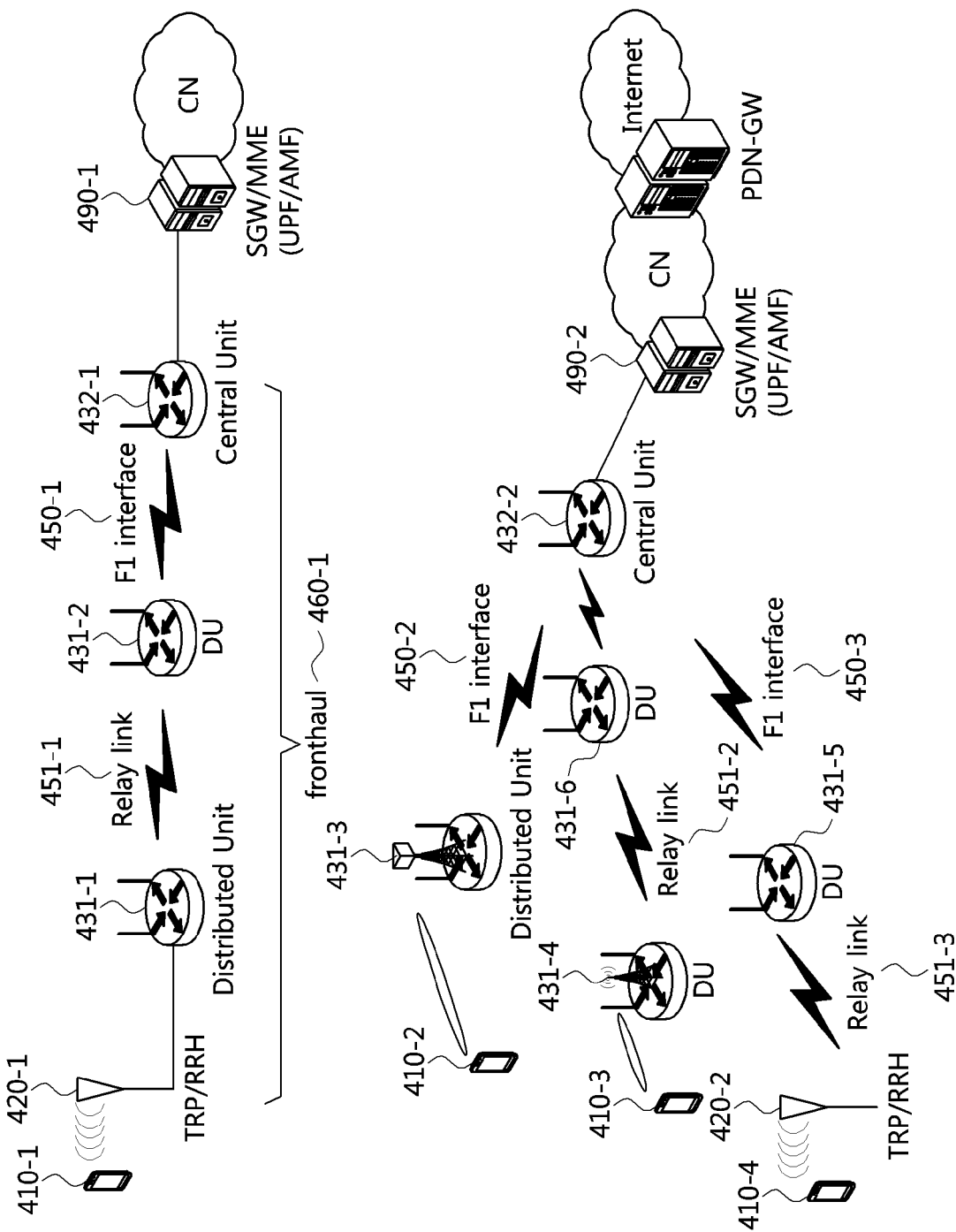
FIG. 4 is a conceptual diagram for explaining in more detail a structure of a mobile communication network to which exemplary embodiments of the present invention are applied.

FIG. 3 is a conceptual diagram for explaining a structure of a mobile communication network to which exemplary embodiments of the present invention are applied, and FIG. 4 is a conceptual diagram for explaining in more detail a structure of a mobile communication network to which exemplary embodiments of the present invention are applied.

Referring to FIG. 3, an exemplary embodiment of a method of connecting a base station and a core network in a mobile communication network using fronthaul and backhaul is shown. In a cellular communication network, a base station 310 (or macro base station) or a small base station 330 may be connected to a termination node 340 of the core network by a wired backhaul 380.

Here, the termination node 340 of the core network may be a Serving Gateway (SGW), a User Plane Function (UPF), a Mobility Management Entity (MME), an Access and Mobility Function (AMF), or the like.

In addition, when base station functions are configured as split into a baseband processing function block 360 (e.g., a baseband unit (BBU) or a cloud platform) and a remote radio transmission and reception node 320 (e.g., a remote radio head (RRH) or a transmission & reception point (TRP)), the baseband processing function block 360 and the remote radio transmission and reception node 320 may be connected through a wired fronthaul 370.

The baseband processing function block 360 may be located at the base station 310 that supports a plurality of remote radio transmission and reception nodes 320 or may be configured as a logical function between the base station 310 and the termination node 340 of the core network to support multiple base stations. In this case, functions of the baseband processing function block 360 may be physically configured independently of the base station 310 and the termination node 340 of the core network, or may be installed and operated at the base station 310 (or the termination node 340 of the core network).

Each of the remote radio transmission and reception nodes 320, 420-1, and 402-2 of FIGS. 3 and 4, and each of the base stations 110-1, 110-2, 110-3, 120-1, 120-2, 310, 330, 431-3, and 431-4 of FIGS. 1, 3, and 4 may support OFDM, OFDMA, SC-FDMA, or NOMA based downlink transmission and uplink transmission with terminals.

In addition, when the remote radio transmission and reception nodes of FIGS. 3 and 4 and the plurality of base stations of FIGS. 1, 3, and 4 support a beamforming function using an antenna array in a transmission carrier of a mmWave band, services may be provided without interference between beams within the base station through the respectively formed beams, and services for a plurality of terminals (or user equipments (UEs)) may be provided within one beam.

In addition, each of the plurality of base stations 110-1, 110-2, 110-3, 120-1, 120-2, 310, 330, 471, and 472 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communication (or, proximity services (ProSe)), or the like. Here, each of the plurality of UEs 130-1, 130-2, 130-3, 130-4, 130-5, 130-6, 410-1, 410-2, 410-3, and 410-4 may perform operations corresponding to the operations of the plurality of base stations 110-1, 110-2, 110-3, 120-1, and 120-2, and operations supported by the plurality of base stations 110-1, 110-2, 110-3, 120-1, 120-2, 310, 330, 431-3, and 431-4. For example, the second base station 110-2 may transmit a signal to the fourth UE 130-4 in the SU-MIMO manner, and the fourth UE 130-4 may receive the signal from the second base station 110-2 in the SU-MIMO manner. Alternatively, the second base station 110-2 may transmit a signal to the fourth UE 130-4 and fifth UE 130-5 in the MU-MIMO manner, and each of the fourth UE 130-4 and fifth UE 130-5 may receive the signal from the second base station 110-2 in the MU-MIMO manner. Each of the first base station 110-1, the second base station 110-2, and the third base station 110-3 may transmit a signal to the fourth UE 130-4 in the CoMP transmission manner, and the fourth UE 130-4 may receive the signal from the first base station 110-1, the second base station 110-2, and the third base station 110-3 in the CoMP manner. Each of the plurality of base stations 110-1, 110-2, 110-3, 120-1, and 120-2 may exchange signals with the corresponding UEs 130-1, 130-2, 130-3, 130-4, 130-5, or 130-6 which belongs to its cell coverage in the CA manner. Each of the base stations 110-1, 110-2, and 110-3 may coordinate D2D communications between the fourth UE 130-4 and the fifth UE 130-5, and thus the fourth UE 130-4 and the fifth UE 130-5 may perform the D2D communications under coordination of each of the second base station 110-2 and the third base station 110-3.

Then, operation methods of communication nodes in a mobile communication network will be described. Even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In the following description, the SGW is a termination node of a core network for exchanging data packets with a base station providing services to a user terminal using a radio access protocol. Also, the MME is an entity in charge of a control function in a radio access section (or interface) for user terminals in a wireless communication network. Thus, in the following description, the present invention is not limited to the specific terms 'SGW' or 'MME'. That is, the above-described terms may be replaced with other terms indicating a function that supports a radio access protocol according to a radio access technology (RAT) or an entity that performs the corresponding function according to a configuration of the core network.

Referring to FIG. 4, an exemplary embodiment of a configuration of a radio link between nodes to which functional split is applied is shown. When the functional split is applied, a node of a radio access network may be classified into a central unit (CU) and a distributed unit (DU).

The CU 432-1 or 432-2 (e.g., gNB-CU in the 3GPP-based NR systems) is a logical node that controls operations of one or more DUs and performs radio resource control (RRC), service data adaptation protocol (SDAP), or packet data convergence protocol (PDCP) functions according to an RRC protocol and a PDCP protocol.

The DU 431-1, 431-2, 431-3, 431-4, 431-5, or 431-6 (e.g., gNB-DU in the NR system) may be a logical node that performs functions of a radio link control (RLC) layer, a medium access control (MAC) layer, and a PHY layer, or partial functions of the PHY layer. One DU may support one or more cells, and one cell may support only one DU. The operation of the DU may be partially controlled by the CU, and the DU may be connected to the CU through an F1 interfaces 450-1, 450-2, or 450-3.

In addition, a DU (e.g., 431-2 or 431-6) for relaying may be present in a connection section between the DUs 431-1 and 431-4 and the CUs 432-1 and 432-2 according to configuration, roles, or properties of the nodes for the functional split. In this case, the interfaces between the DUs 431-1 and 431-4 and the DUs 431-2 and 431-6 may be connected through relay links 451-1 and 451-2. In addition, the DU 431 may be connected with the TRPs (or RRHs) 420-1 and 420-2 in a wired or wireless manner, or may be configured as integrated in the base stations 431-3 and 431-4.

Meanwhile, in the 3GPP NR system using the millimeter frequency band, a bandwidth part (BWP) concept is applied to secure flexibility of channel bandwidth operation for packet transmission. The base station may configure up to four BWPs having different bandwidths to the terminal. The BWPs may be configured independently for downlink and uplink. Each BWP may have not only a different bandwidth but also a different subcarrier spacing (SCS).

Figure 5:
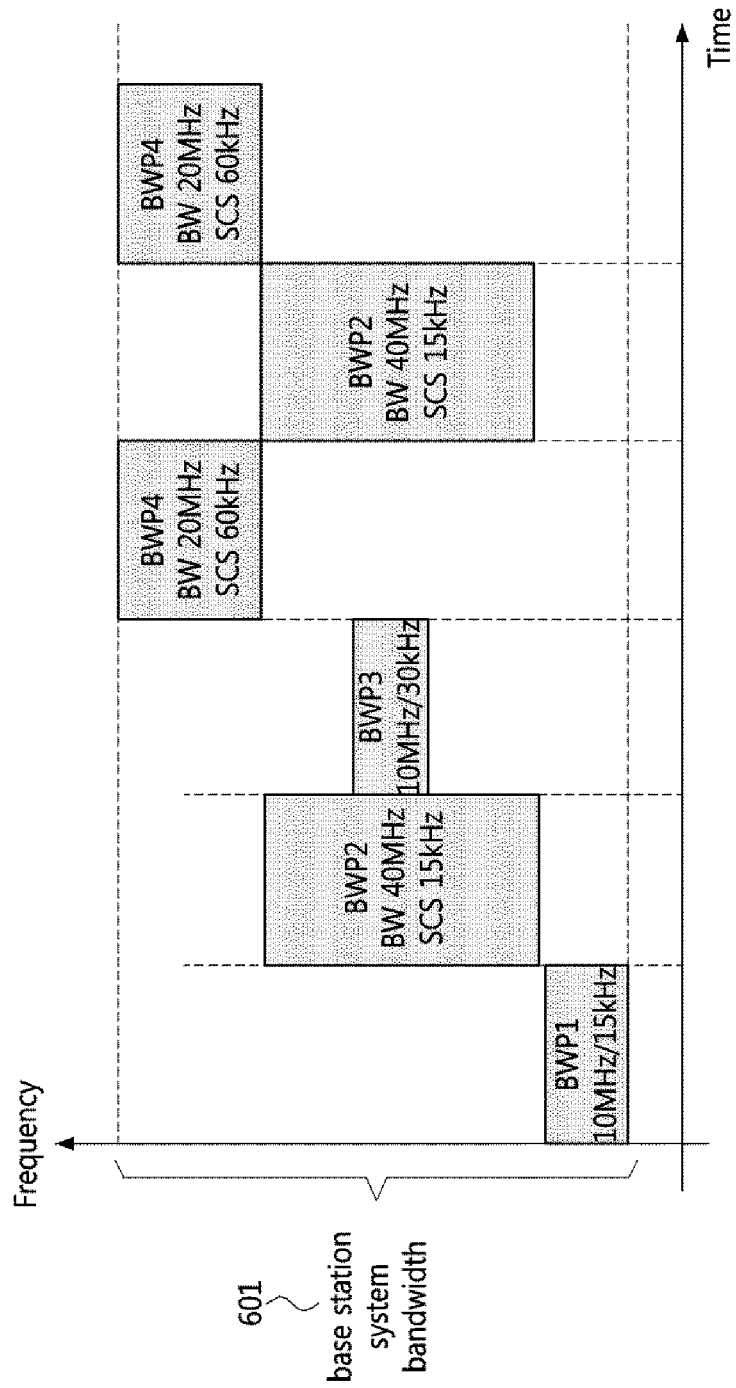
FIG. 5 is a conceptual diagram for explaining an example of configuring bandwidth parts in a 3GPP NR system to which exemplary embodiments of the present invention can be applied.

FIG. 5 is a conceptual diagram illustrating an example of configuring bandwidth parts in a 3GPP NR system to which exemplary embodiments of the present invention can be applied.

As shown in FIG. 5, a BWP is a bandwidth configured for transmission and reception of the terminal. The BWPs (i.e., BWP1, BWP2, BWP3, and BWP4 of FIG. 5) may be configured not to be larger than a system bandwidth 601 supported by the base station.

For example, BWP1 is configured with 10 MHz bandwidth having 15 kHz SCS, BWP2 is configured with 40 MHz bandwidth having 15 kHz SCS, BWP3 is configured with 10 MHz bandwidth having 30 kHz SCS, and BWP4 is configured with 20 MHz bandwidth having 60 kHz SCS.

The BWP may be classified into an initial BWP, an active BWP, or an optional default BWP. The terminal may perform an initial access procedure with the base station using the initial BWP. One or more BWPs may be configured through an RRC connection configuration message, and one of them may be configured as the active BWP. The terminal and the base station may transmit or receive data packets using the active BWP among the configured BWPs, and the terminal may perform a control channel monitoring operation for packet transmission and reception with respect to the active BWP.

In addition, the terminal may switch from the initial BWP to the active BWP or the default BWP, or may switch from the active BWP to the initial BWP or the default BWP. Such the BWP switching may be performed based on an indication of the base station or a timer. The indication of the base station for switching the BWP may be transmitted to the terminal using RRC signaling or a DCI of a physical downlink control channel, and the terminal may switch to the BWP indicated by the received RRC signaling or DCI. For example, in the NR system, when an RA resource is not configured in the active UL BWP, the terminal may switch from the active UL BWP to the initial UL BWP in order to perform a random access procedure.

Mobility Support Method

Figure 6:
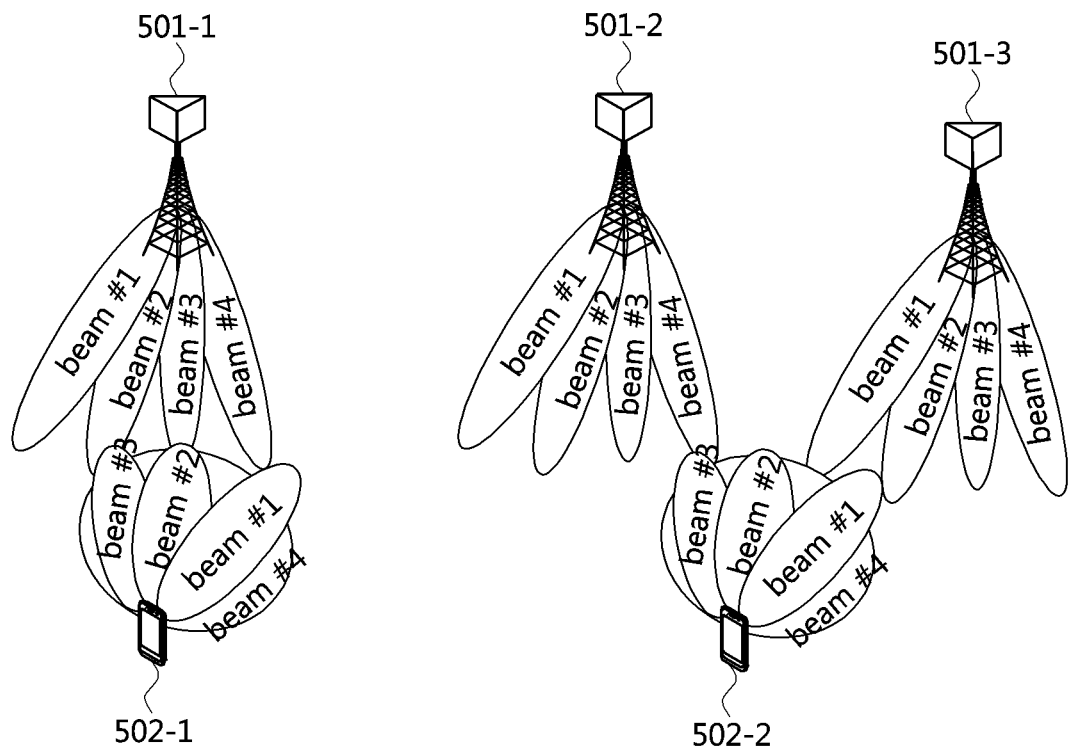
FIG. 6 is a conceptual diagram for explaining a mobility support method according to an exemplary embodiment of the present invention.

FIG. 6 is a conceptual diagram illustrating a mobility support method according to an exemplary embodiment of the present invention.

Referring to FIG. 6, a case in which a beamforming function is applied between the base station and the terminal is shown. In the following description, it is assumed that a signal transmitted by the base station is used to provide an inter-base station mobility function or to select an optimal beam within the base station. However, a signal transmitted by the terminal may be used for the purpose.

In FIG. 6, the terminal 502-1 or 502-2 may be in a state of establishing a connection with the base station 501-1, 501-2, or 501-3 and receiving services from the base station, in a state of establishing a connection with the base station 501-1, 501-2, or 501-3, or in a state of existing within a service coverage of the corresponding base station without establishing a connection therewith.

In a mobile communication system using a base station to which beamforming techniques are applied in a high frequency band, a function of changing a beam configured between the base station and the terminal 502-1 in the base station 501-1, and a mobility support and radio resource management function of changing beams configured between the terminal 502-2 and the base stations 501-2 and 501-3 may be considered.

For example, when a beam #3 of the base station 501-1 and a beam #2 of the terminal 502-1 are configured (or, beam paired), and services are provided by the base station 501-1, according to a change of radio channel quality, the beam used between the base station 501-1 and the terminal 502-1 may be changed from the beam #3 of the base station to another beam (e.g., beam #2 or beam #4) of the base station. Alternatively, the beam used between the base station 501-1 and the terminal 502-1 may be changed from the beam #2 of the terminal to another beam (e.g., beam #3, beam #1, or beam #4) of the terminal.

Meanwhile, the terminal 502-2, which has configured a beam with the base station 501-2, may perform a mobility support and radio resource management function based on a handover procedure, which changes the beam currently in use to a beam of the adjacent base station 501-3 according to a change in radio channel quality.

In order to perform the mobility support and radio resource management function, the base station may transmit a synchronization signal or a reference signal for the terminal to search or monitor. In case of a base station using a frame format supporting a plurality of symbol lengths to support multi-numerology, monitoring by the terminal may be performed for a synchronization signal or a reference signal configured with an initial numerology, default numerology, or default symbol length.

Here, the initial numerology or the default numerology may be a configuration of a frame format applied to radio resources in which a UE-common search space is configured, a frame format applied to radio resources in which a control resource set (CORESET) ZERO (or, CORESET #0) of physical downlink control channels of the 3GPP new radio access technology (New RAT, NR) system is configured, or a frame format applied to radio resources through which a synchronization symbol burst for identifying a cell in the 3GPP NR system is transmitted.

Here, the frame format may refer to information on configuration parameters (e.g., values of the configuration parameters, offset, index, identifier, range, periodicity, or interval (or, duration), etc.) such as a subcarrier spacing (SCS) configuring a radio frame (or subframe), a control channel configuration (e.g., configuration of CORESET), a symbol (or slot) configuration, a reference signal configuration, or the like. The information on the frame format may be transferred to the terminal using system information or a dedicated control message.

In addition, the terminal, which has configured a connection with the base station, may perform a beam management operation by monitoring a configured beam or an activated beam through transmission of an uplink dedicated reference signal configured by the base station or reception of a downlink dedicated reference signal configured by the base station.

For example, the base station 501-1 may transmit a synchronization signal (SS) and/or a downlink reference signal so that terminals in its service coverage can search for itself to perform downlink synchronization maintenance, beam configuration, or radio link monitoring operations. Also, the terminal 502-1, which has configured a connection with the serving base station 501-1, may receive physical layer radio resource configuration information for connection configuration and radio resource management from the serving base station.

Here, the physical layer radio resource configuration information may mean configuration parameters in RRC control messages of the LTE or NR system such as PhysicalConfigDedicated, PhysicalCellGroupConfig, PDCCH-Config, PDCCH-PDCCH-ConfigSIB1, ConfigCommon, PUCCH-Config, RACH-ConfigCommon, RACH-ConfigDedicated, RadioResourceConfigCommon, RadioResourceConfigDedicated, ServingCellConfig, ServingCellConfigCommon, or the like, and may include the following information. The configuration information may include parameter values such as a configuration (or allocation) periodicity of a corresponding signal (or radio resource) based on a frame format of a base station (or transmission frequency), position information of a radio resource for transmission in a time domain/frequency domain, a transmission (or allocation) time, or the like. Here, the frame format of the base station (or transmission frequency) may mean a frame format having a plurality of symbol lengths according to a plurality of SCS within one radio frame to support multi-numerology. That is, the number of symbols constituting mini-slots, slots, and subframes that exist within one radio frame (e.g., a frame of 10 ms) may be configured differently.

(1) Configuration information of transmission frequency and frame format of base station
  Transmission frequency information: information on all transmission carriers (i.e., cell-specific transmission frequency) in the base station, information on BWPs in the base station, information on a transmission time reference or time difference between transmission frequencies in the base station (e.g., transmission periodicity or offset parameter indicating the transmission reference time (or time difference) of the synchronization signal), etc.
  Frame format information: configuration parameters of a mini-slot, slot, subframe that supports a plurality of symbol lengths according to SCS.

(2) Configuration information of downlink reference signal (e.g., channel state information-reference signal (CSI-RS), common reference signal (Common-RS), etc.)
  Configuration parameters such as a transmission periodicity, a transmission position, a code sequence, or a masking (or scrambling) sequence for a reference signal commonly applied in the coverage of the base station (or beam).

(3) Configuration information of uplink control signal
  Configuration parameters such as a sounding reference signal (SRS), uplink beam sweeping (or beam monitoring) reference signal (RS), uplink grant-free radio resources, or uplink radio resources (or RA preamble) for random access, etc.

(4) Configuration information of physical downlink control channel (PDCCH)
  Configuration parameters such as a reference signal for PDCCH demodulation, a beam common reference signal (e.g., a reference signal that can be received by all terminals in a beam coverage), a beam sweeping (or beam monitoring) reference signal, a reference signal for channel estimation, etc.

(5) Configuration information of physical uplink control channel (PUCCH)
  Scheduling request signal configuration information
  Configuration information for a feedback (ACK or NACK) transmission resource for supporting HARQ functions, etc.
  Number of antenna ports, antenna array information, beam configuration or beam index mapping information for application of beamforming techniques
  Configuration information of downlink and/or uplink signals (or uplink access channel resource) for beam sweeping (or beam monitoring)
  Configuration information of parameters for beam configuration, beam recovery, beam reconfiguration, or radio link re-establishment operation, a beam change operation within the same base station, a reception signal of a beam triggering handover execution to another base station, timers controlling the above-described operations, etc.

In case of a radio frame format that supports a plurality of symbol lengths for supporting multi-numerology, the configuration (or allocation) periodicity of the parameter constituting the above-described information, the time-domain and frequency-domain position information of the radio resource, or the transmission (or allocation) time may be information configured for each corresponding symbol length (or subcarrier spacing).

In the following description, 'Resource-Config information' may refer to a control message for radio resource configuration including at least one parameter among the above-described physical layer radio resource configuration information. In the following description, a property or setting value (or range) of an information element (or parameter) transmitted by the corresponding control message may have a meaning, rather than the name of 'Resource-Config information'. Thus, the information element (or parameter) conveyed by the Resource-Config control message may be radio resource configuration information which is commonly applied to the entire base station (or beam) coverage or dedicatedly allocated to a specific terminal (or terminal group). The configuration information of the above-described Resource-Config information may be configured as one control message or may be configured as different control messages according to the property of the configuration information. In addition, the beam index may be represented without distinction between transmission beam indexes and reception beam indexes by using an index (or identifier) of a reference signal mapped or associated with the corresponding beam, or an index (or identifier) of a transmission configuration indicator (TCI) state for beam management.

Therefore, the terminal 502-1 in the connected state may be provided with services through a beam configured with the base station 501-1. For example, when the beam #3 of the base station 501-1 and the beam #2 of the terminal 502-1 are configured (or beam paired) for the terminal to receive services, the terminal 502-1 may search or monitor a downlink radio channel by using a downlink synchronization signal (e.g., a synchronization signal block (SSB) of the 3GPP NR system) and a downlink reference signal (e.g., CSI-RS of the NR system) of the beam #3 of the base station. Here, that the beams are configured (or beam paired) and services are provided may mean that packets are transmitted or received through an activated beam among one or more configured beams. In the 3GPP NR system, activation of a beam may mean that a configured TCI state is activated.

Through such the radio link monitoring (RLM) operation, the terminal 502-1 may detect a radio link problem. Here, the detection of a radio link problem means that there is an error in configuring or maintaining physical layer synchronization for the corresponding radio link. That is, this means that it is detected that the physical layer synchronization of the terminal has not been maintained for a certain time. When a radio link problem is detected, a radio link recovery operation may be performed. If the radio link problem is not recovered, a radio link failure (RLF) may be declared, and a radio link re-establishment procedure may be performed.

A physical layer (Layer 1 or physical layer), Layer 2 functions such as Medium Access Control (MAC), Radio Link Control (RLC), Packet Data Convergence Protocol (PDCP), etc., or Layer 3 functions such as Radio Resource Control (RRC) of the radio protocol constituting the radio link may participate in the procedures such as the detection of a physical layer problem in a radio link, the radio link recovery, the radio link failure detection (or declaration), and the radio link re-establishment according to the radio link monitoring operation.

The physical layer of the terminal may receive a downlink synchronization signal and/or a reference signal (RS) to monitor the radio link. In this case, the reference signal may be a base station common reference signal (Common RS) or a beam common reference signal, or a dedicated reference signal allocated to the terminal (or terminal group). Here, the common reference signal refers to a reference signal that can be received by all terminals within the coverage (or service area) of the corresponding base station or beam to estimate a channel. In addition, the dedicated reference signal refers to a reference signal that can be received and used for channel estimation only by a specific terminal or terminal group within the coverage of the base station or the beam.

Therefore, when the base station or the configured beam is changed, the dedicated reference signal for managing the changed beam may be changed. This means that a procedure for selecting another beam from among the beams configured through the configuration parameters between the base station and the terminal or changing the configured beam is required. In the 3GPP-based NR system, changing the beam means that an index of another TCI state is selected among the indexes (or identifiers) of the configured TCI states or a new TCI state is configured and changed to an active state. Configuration information on the common reference signal may be obtained by the terminal through system information. Alternatively, in case of a handover in which the base station is changed or in case of connection reconfiguration, the base station may transmit the configuration information on the common reference signal to the terminal through a dedicated control message.

In order to provide service continuity between the base station and the terminal, a method in which the terminal provides services by allocating a plurality of beams to one terminal may be considered. For example, in FIG. 6, the base station 501-1, 501-2, or 501-3 may allocate a plurality of beams to the terminal 502-1 or 502-2. That is, the base station 501-1 may allocate the beam #2, the beam #3, and the beam #4 to the terminal 502-1. Alternatively, the base station 501-2 may allocate the beam #3 and the beam #4 to the terminal 502-2.

In this case, the plurality of beams may be allocated in consideration of moving speed, moving direction, location information, radio channel quality, or beam interference of the corresponding terminal. For example, when the moving speed of the terminal 502-1 is slow, the base station 501-1 may allocate the beams #2 and #3 adjacent to each other to the terminal 502-1. However, when the moving speed of the terminal 502-1 is fast, the base station 501-1 may allocate the beams #2 and #4 to the terminal 502-1, which are not adjacent to each other and are separated from each other.

When the terminal 502-2 moves to the base station 501-3 while receiving services by being allocated the beams #3 and #4 from the base station 501-2, if the base station 501-2 and the base station 501-3 are base stations belonging to different cells (or sectors), the terminal 502-2 may perform a handover procedure. During the handover, the terminal 502-2 may receive information on the configuration of the beams #1 and #2 of the base station 501-3 from the base station 501-2 through a handover control message. Meanwhile, the information on the beams #1 and #2 may be obtained by the base station 501-2 through a procedure in which the terminal 502-2 reports measurement results for the target/neighbor base station 501-3 to the base station 501-2.

In this case, the information on configuration of the beams may include at least one of index information of a transmission or reception beam configured according to a beam monitoring or beam measurement result, configuration information (e.g., transmission power, beamwidth, vertical/horizontal angle, etc.) of the corresponding beam, transmission or reception timing information (e.g., index, offset value, or the like of subframe, slot, mini-slot, symbol, etc.) of the corresponding beam, configuration information of a reference signal of the corresponding beam, and sequence information or index information of a reference signal of the corresponding beam.

In order to allocate a plurality of beams as described above, the plurality of beams allocated between the base stations 501-2 and 501-3 and the terminal 502-2, and the moving state (moving speed, moving direction, location information, etc.) of the terminal, the beam monitoring and measurement results, etc. may be reported or transferred as included in a signaling control message for performing the handover.

In addition, when the terminal 502-2 moves to the base station 501-3 while receiving services by being allocated the beams #3 and #4 from the base station 501-2, if the base station 501-2 and the base station 501-3 are base stations belonging to the same cell (or sector), an intra-cell transmission node change procedure may be performed. Here, the base station 501-2 and the base station 501-3 may be nodes (e.g., RRH, TRP, node to which a radio protocol functional split is applied, etc.) in which the radio protocols such as physical layer, MAC layer, RLC layer, PDCP layer, adaptation layer, or RRC layer, which constitute a radio access network, are partially configured. In this case, the adaptation layer (e.g., service data adaptation protocol (SDAP) layer of the NR system) is a layer higher than the PDCP, and performs functions such as mapping between a QoS flow and a data radio bearer (DRB) or marking of a QoS flow identifier for downlink (or uplink) packets.

As such, in the base stations belonging to the same cell, when the radio protocol layers for the radio access network are partially configured excluding the RRC layer, a base station change procedure from the base station 501-2 to the base station 501-3 for the terminal 502-2 may be performed through the exchange of control messages of the MAC layer (e.g., MAC control element (CE) or control PDU) without exchanging control messages of the RRC layer.

That is, which layer of the radio protocol layers is responsible for generating and transmitting/receiving the control messages for the base station change may be determined according to up to which of the radio protocol layers for the radio access network the corresponding base station (e.g., 501-2 or 501-3 of FIG. 6) is configured to include.

For example, if the base station 501-2 and the base station 501-3 are configured to include the MAC layer (or RLC layer), the control messages for the base station change may be generated at a higher layer than the MAC layer (or RLC layer), and transmitted or received between the terminal and the base station, and the MAC function (or, MAC function and RLC function) of the terminal and the base station should be newly configured after being reset.

However, when the base station 501-2 and the base station 501-3 are configured to include only a part of the MAC layer or are configured only with physical layer functions, the control messages for the base station change may be generated in the MAC layer, and transmitted or received between the terminal and the base station, and the base station change may be performed without resetting the MAC function of the terminal and the base station.

When the change of the base station (or transmission node) described above occurs, information for identifying the corresponding transmitting base station may be transferred to the terminal by using a control message of the RRC layer or the MAC layer, or a physical layer control channel according to configuration conditions of the radio protocol layers of the base station (e.g., 501-2, 501-3). In this case, the information for identifying the transmitting base station (or transmission node) may include an identifier of the base station (or transmission node), reference signal information, information on a configured beam (or configured TCI state), information on a sequence (or scrambling) identifier for the base station (or transmission node), or the like.

The reference signal information may be a radio resource of a reference signal allocated for each transmitting base station, sequence information or index information of the reference signal, or sequence information or index information of a dedicated reference signal allocated to the terminal. Here, the radio resource of the reference signal may mean parameters indicating a symbol position on a time axis at which the reference signal is transmitted and a relative or absolute subcarrier position on a frequency axis within a radio resource region such as a frame, subframe, or slot. Such the parameter may be represented by a number or the like sequentially assigned to index, symbol, or subcarrier, which represents a corresponding radio resource element or radio resource set. Hereinafter, the reference signal information may refer to the above-described transmission periodicity, the code sequence or masking (or scrambling) of the reference signal, the radio resource of the reference signal, index information, or the like. The reference signal identifier may refer to a parameter (e.g., resource ID, resource set ID) that can distinguish the corresponding reference signal information uniquely among one or more reference signal information.

The information on the configured beam may be an index (or identifier) of the configured beam (or configured TCI state), configuration information of the corresponding beam (e.g., transmission power, beamwidth, vertical/horizontal angle, etc.), transmission or reception timing information (e.g., an index or an offset value of subframe, slot, mini-slot, symbol, etc.) of the corresponding beam, or reference signal information or reference signal identifier information corresponding to the corresponding beam.

Accordingly, the terminal may identify a target base station (or transmission node) to perform a beam monitoring operation, a radio access operation, or a transmission/reception operation of a control (or data) packet by using identification information of the transmitting base station (or transmission node), which the base station transmits using the control message of the RRC layer or the MAC layer, or the physical layer control channel.

In the case where a plurality of beams are configured, the base station and the terminal may transmit and receive packet information with all the configured beams, and the number of downlink beams may be the same as or different from the number of uplink beams. For example, a plurality of downlink beams from the base station to the terminal may be configured, and one uplink beam from the terminal to the base station may be configured.

Alternatively, when a plurality of beams are configured, the base station and the terminal may not transmit and receive packet information with all the configured beams, and some of the configured plurality of beams may be configured as reserved (or candidate) beam(s) not for transmitting and receiving packet information. For example, the configured plurality of beams may be configured in form of primary beam, secondary beam, or reserved (or candidate) beam(s). In the NR system, such the configuration of the plurality of beams may mean that the configured TCI state identifiers (IDs) are configured in form of primary, secondary, or reserved.

For example, the primary beam (e.g., primary TCI state ID) may mean a beam capable of transmitting and receiving data and control signaling, and the secondary beam (e.g., secondary TCI state ID or deactivated TCI state ID) may mean a beam capable of transmitting and receiving only data packets excluding control signaling. Here, the exclusion of the control signaling may be performed by a method of restricting the control signaling of physical layer, layer 2 (e.g., layer 2 such as MAC, RLC, PDCP, etc.), or layer 3 (e.g., layer 3 such as RRC, etc.) according to each layer, a method of partially restricting them according to functions within the layer, or a method of restricting them according to the type of the control message. However, the type of control message may mean a type of control message generated or transmitted/received according to operational functions of the radio protocol such as discontinuous transmission/reception (DRX/DTX) operations, retransmission operations, connection configuration and management operations, measurement/reporting operations, operations of a paging procedure, operations of an access procedure, etc.

In addition, the reserved (or candidate) beam (e.g., reserved TCI sate ID or deactivated TCI state ID) may be limited in transmission and reception of data or signaling packets. Also, the reserved (or candidate) beam may be configured as a beam on which the base station or the terminal performs only beam monitoring operations for beam matching (or configuration) or performs only measurement and reporting operations. Accordingly, measurement results for the reserved (or candidate) beam may be reported using the primary beam or the secondary beam. The measurement or reporting on the reserved (or candidate) beam may be performed in accordance with a related configuration parameter or periodically or aperiodically in accordance with a determination or event condition of the terminal. In particular, the report of the results of measurement or beam monitoring on the reserved (or candidate) beam may be transmitted using a physical layer control channel, such as a physical uplink control channel (PUCCH) of the LTE (or NR) system, or a control message of the MAC layer (e.g., a form such as MAC control PDU). Here, the result of the beam monitoring may refer to measurement results of one or more beams (or beam groups) as results of the beam monitoring (or beam sweeping) operation on the formed beam of the base station, which is performed by the terminal.

Based on the report of results of beam measurement or beam monitoring, the base station may change the property (e.g., primary beam, secondary beam, reserved (or candidate) beam, active beam, or deactivated beam) of the beam (or property of the TCI state). Here, when the TCI state is changed, the property of the TCI state may be changed to a primary TCI state, a secondary TCI state, a reserved (or candidate) TCI state, a configured TCI state, an active TCI state, a deactivated TCI state, or the like.

As described above with respect to the property of the TCI state, a state in which a data packet or control signaling can be transmitted or received even in a limited manner, such as the primary TCI state or the secondary TCI state, may be assumed as the active TCI state or a serving TCI state. Also, a state in which it is a target of measurement or management, but data packets or control signaling cannot be transmitted or received, such as the reserved (or candidate) TCI state, may be assumed as the deactivated TCI state or configured TCI state.

The change of the property of the beam (or TCI state) may be controlled at the RRC layer or the MAC layer. When changing the property of a beam (or TCI state) at the MAC layer, the MAC layer may notify the higher layer of the beam property change. In addition, the change of beam property may be transferred to the terminal using a control message of the MAC layer or a physical layer control channel (e.g., a physical downlink control channel (PDCCH) of the LTE (or NR) system). Here, when the physical layer control channel is used, the control information may be configured in form of downlink control information (DCI), uplink control information (UCI), or a separate indicator (or field information) of the LTE (or NR) system.

The terminal may request to change the TCI state property based on the beam measurement or monitoring results. The control information or feedback information for requesting the change of the TCI state property may be transmitted using a physical layer control channel, a MAC layer control message, or an RRC control message. The control message, signaling information, or feedback information for changing the TCI state property may be configured using at least one or more parameters from the above-described information on configured beam.

The property change of the beam (or TCI state) described above may mean a change from the active beam to the deactivated beam or reserved (or candidate) beam, or a change from the primary beam to the secondary beam or reserved (or candidate) beam, or vice versa. That is, it means that the property of the beam is changed between the beam properties described above, and the change of beam property may be performed in the RRC layer or the MAC layer. If necessary, the beam property change may be performed through partial cooperation between the RRC layer and the MAC layer.

In addition, when a plurality of beams are allocated, a beam for transmitting a physical layer control channel may be configured and operated. That is, a physical layer control channel may be transmitted using all the multiple beams (e.g., the primary beam or the secondary beam) or a physical layer control channel may be transmitted using only the primary beam.

Here, the physical layer control channel is a channel such as PDCCH or PUCCH of the LTE (or NR) system, and may transmit scheduling information including radio resource element (RE) allocation and modulation and coding scheme (MCS) information, channel quality indication (CQI), precoding matrix indicator (PMI), feedback information such as HARQ ACK/NACK, resource request information such as scheduling request (SR), beam monitoring result (or TCI state ID) for supporting beamforming function, measurement information on active or inactive beams, or the like.

In case that the physical layer control channel is transmitted using only a downlink primary beam transmitted from the base station to the terminal, the feedback information may be received through the physical layer control channel of the primary beam or data transmitted through the secondary beam may be demodulated and decoded using control information obtained through the physical layer control channel of the primary beam.

Alternatively, in case that the physical layer control channel is transmitted using only an uplink primary beam transmitted from the terminal to the base station, scheduling request information or feedback control information may be transmitted through the physical layer control channel of the primary beam.

In the case of the multiple beam allocation (or TCI state configuration) described above, parameters indicating allocated (or, configured) beam indexes for the multiple beams (or TCI states), spacing between the allocated beams, or whether or not contiguous beams are allocated may be transferred through signaling between the base station and the terminal. Signaling for such the beam allocation may be configured differently according to a report from the terminal such as moving speed, moving direction, or location information of the terminal, or moving state, moving speed, moving direction, and location information of the terminal, or the quality of radio channel, which the base station can recognize or obtain by other means. Here, the quality of radio channel may refer to a signal quality of a radio channel represented by a channel state indicator (CSI), a Received Signal Strength Indicator (RSSI), a Reference Signal Received Power (RSRP), a Reference Signal Received Quality (RSRQ), or the like.

In the above description, the radio resource may be configured by frequency-axis parameters such as center frequency, system bandwidth, subcarriers, or the like and time-axis parameters according to a unit of transmission (or reception) time (or, periodicity, interval, window) such as radio frame, subframe, transmission time interval (TTI), slot, mini-slot, symbol, or the like. Additionally, the radio resource may refer to a resource occupied for transmission in the radio section by applying a hopping pattern of the radio resource, a beam forming technique using multiple antennas (e.g., beam configuration information, beam index), or a code sequence (or bit sequence or signal sequence). In case of such the radio resource, the name of the physical layer channel (or transport channel) may vary according to the type (or property) of data or control message to be transmitted, uplink, downlink, sidelink (or side channel), or the like.

Such the reference signal for beam (or TCI state) or radio link management may include a synchronization signal such as a synchronization signal (SS) or a synchronization signal block (SSB), a channel state information reference signal (CSI-RS), a phase tracking (PT-RS), a sounding reference signal (SRS), a demodulation reference signal (DM-RS), or the like. A reference parameter for reception quality of the reference signal for beam (or TCI state) or radio link management may be configured as a parameter such as a measurement unit time, a measurement interval, a reference value indicating a degree of improved change, a reference value indicating a degree of deteriorated change, or the like. The measurement unit time or measurement interval may be configured as an absolute time reference (e.g., ms, sec, etc.), transmission timing interval (TTI), a radio channel configuration such as symbol, slot, (sub)frame, scheduling periodicity, etc., an operation periodicity of the base station or terminal, or the like. Also, the reference value representing the degree of change in reception quality may be configured as an absolute value (dBm) or a relative value (dB). Also, the reception quality of the reference signal for beam (or TCI state) or radio link management may be represented by Reference Signal Received Power (RSRP), Reference Signal Received Quality (RSRQ), Received Signal Strength Indicator (RSSI), Signal-to-Noise Ratio (SNR), Signal-to-Interference Ratio (SIR), or the like.

Beam Management Procedure

The measurement or monitoring operation for beam (or TCI state) or radio link management described above may be performed by the base station or the terminal. The base station or the terminal may perform the measurement or monitoring operation according to the parameters configured for the measurement operation or monitoring, and the terminal may report measurement results according to configuration parameters for the measurement reporting.

According to the measurement result, when the reception quality of the reference signal satisfies a predetermined reference value and/or a preconfigured timer condition, the base station may determine (or, trigger) deactivation (or activation) or the like of the beam according to the beam (or radio link) management, beam switching, or beam blockage situation, and transmit a control message indicating a related operation to the terminal.

In addition, when the reception quality of the reference signal according to the measurement result satisfies the configured reference value and/or preconfigured timer condition, the terminal may report the measurement result or may transmit a control message triggering (or requesting) deactivation (or activation) of the beam according to the beam (or radio link) management operation, beam switching (or TCI state ID change or property change), or the beam blockage situation to the base station.

The basic operation procedure for the beam (or TCI state) management through radio link monitoring may include a beam failure detection (BFD), a beam recovery (BR), or a beam failure recovery (BFR) request procedure, or the like for the radio link. The function for determining the beam failure detection or beam recovery operation and triggering the related procedures, control signaling, or the like may be performed by the physical layer, the MAC layer, the RRC layer, or the like in cooperation, or the related function may be performed by them as partially divided.

The physical layer of the terminal may estimate whether the physical layer is kept synchronized (or, quality of a physical layer control channel) through monitoring of the radio link (or physical layer channel) and transmit the result to a higher layer. The estimation result may be transmitted to the higher layer in form of an in-sync indication (hereinafter referred to as 'IS Ind') or an out-of-sync indication (hereinafter referred to as 'OoS Ind') in the corresponding monitoring interval.

The higher layer of the terminal receiving the IS Ind or OoS Ind from the physical layer may determine whether or not the radio link is maintained by counting the number of corresponding indications continuously received or based on a timer. In case of the timer-based operation, if the IS Ind is not received again until a preconfigured timer expires after receiving the OoS Ind, the beam failure detection (BFD) may be determined (or declared) for the corresponding radio link.

Such the detection (or declaration) may be performed at the MAC layer. For example, the MAC layer of the terminal may determine that a physical layer problem occurs if the OoS Ind is continuously received by a preconfigured value 'N' or if the IS Ind is not received from the physical layer until a preconfigured timer (e.g., timer for Beam Failure Detection (TBFD)) expires after receiving the OoS Ind. Here, N is a positive integer, and the timer TBFD starts when the OoS Ind is received after receiving the IS Ind, and is reset when the IS Ind is received.

Alternatively, if the uplink transmission to the base station does not succeed until a predetermined condition is satisfied, the terminal may determine (or declare) the beam failure detection. For example, in case of transmitting through an uplink grant-free resource or transmitting an uplink resource request (SR), if feedback information or a response message confirming successful reception of the corresponding transmission is not received from the base station even after the transmission is performed (or attempted) by a preconfigured number of times, the terminal may determine (or declare) the beam failure detection. Also, the terminal may determine (or declare) the beam failure detection even when a control message instructing to adjust a transmission timer of the uplink physical channel is not received from the base station before a preconfigured timer expires.

In case of the beam failure detection (BFD) of the radio link, the terminal may perform a beam recovery operation.

For beam recovery, the terminal may transmit a physical layer control channel or reference signal pre-allocated for beam recovery or perform a random access procedure. Also, such the uplink transmission for beam recovery may be configured to be repeatedly transmitted until an associated timer expires, and the related configuration information may be transmitted in advance to the terminal using system information or a separate control message. Here, when performing the beam recovery through a random access procedure, beam recovery completion or failure may be determined based on a successful completion condition of the random access operation or a related timer. Also, when performing the beam recovery through the transmission of the physical layer control channel or the reference signal that is pre-allocated for beam recovery, whether the beam recovery succeeds or fails may be determined based on a condition or timer (e.g., timer for beam recovery (TBR)) for determining success or failure of the beam recovery. The parameter or timer TBR for configuring the reference condition for determining the beam recovery success or failure may be configured as a cell-specific parameter or a UE-specific parameter, and may be notified to the terminal using system information or a dedicated control message.

For example, when a random access procedure is performed for notification of the beam failure detection or the beam recovery failure or for the beam recovery, a random access resource may be allocated to the corresponding terminal so as to perform a non-contention-based random access. Here, the random access resource may be a configuration parameter for transmitting a physical random access channel (PRACH), and may include a random access preamble (i.e., PRACH) index, a PRACH masking parameter, a preamble format for transmitting the PRACH, a time resource for transmitting the PRACH, a frequency resource for transmitting the PRACH, radio resource allocation information for transmitting a random access response message, a window value or related timer information for receiving the random access response message, or the like.

If the terminal does not receive the corresponding random access response until a preconfigured timer expires, the terminal may additionally perform a contention-based random access procedure for notification of the beam failure detection or beam recovery failure or for the beam recovery operation.

Alternatively, when performing the beam recovery operation by transmitting the physical layer control channel or reference signal allocated in advance, the terminal may perform the beam recovery operation by transmitting the corresponding control information or reference signal according to a preconfigured parameter (e.g., a timer or the number of transmissions).

When a result of performing the beam recovery operation does not satisfy a beam recovery success condition, the MAC layer of the terminal may report a final beam recovery failure to the RRC layer. The RRC layer, which has received control information notifying the beam recovery failure from the MAC layer, may determine a radio link failure (RLF) due to the beam recovery failure and perform a radio link re-establishment procedure. In this case, the terminal may transmit a radio link re-establishment request message by setting a cause of the RLF to the beam recovery failure or beam failure.

Radio Link Management Method in Carrier Aggregation Environment A carrier aggregation (CA) function refers to a function in which one terminal configures connections with a plurality of cells. Through the support of the CA function, the terminal may transmit or receive signaling packets, traffic data packets, DCI, UCI, feedback information, or the like through a physical layer data channel (e.g., physical downlink shared channel (PDSCH), physical uplink shared channel (PUSCH)) or a physical layer control channel (e.g., PDCCH, PUCCH) with a plurality of cells connected to the terminal.

When the terminal receives services from a plurality of cells using such the CA function, a primary cell (PCell) and at least one secondary cell (SCell) may be configured for the terminal.

Figure 7:
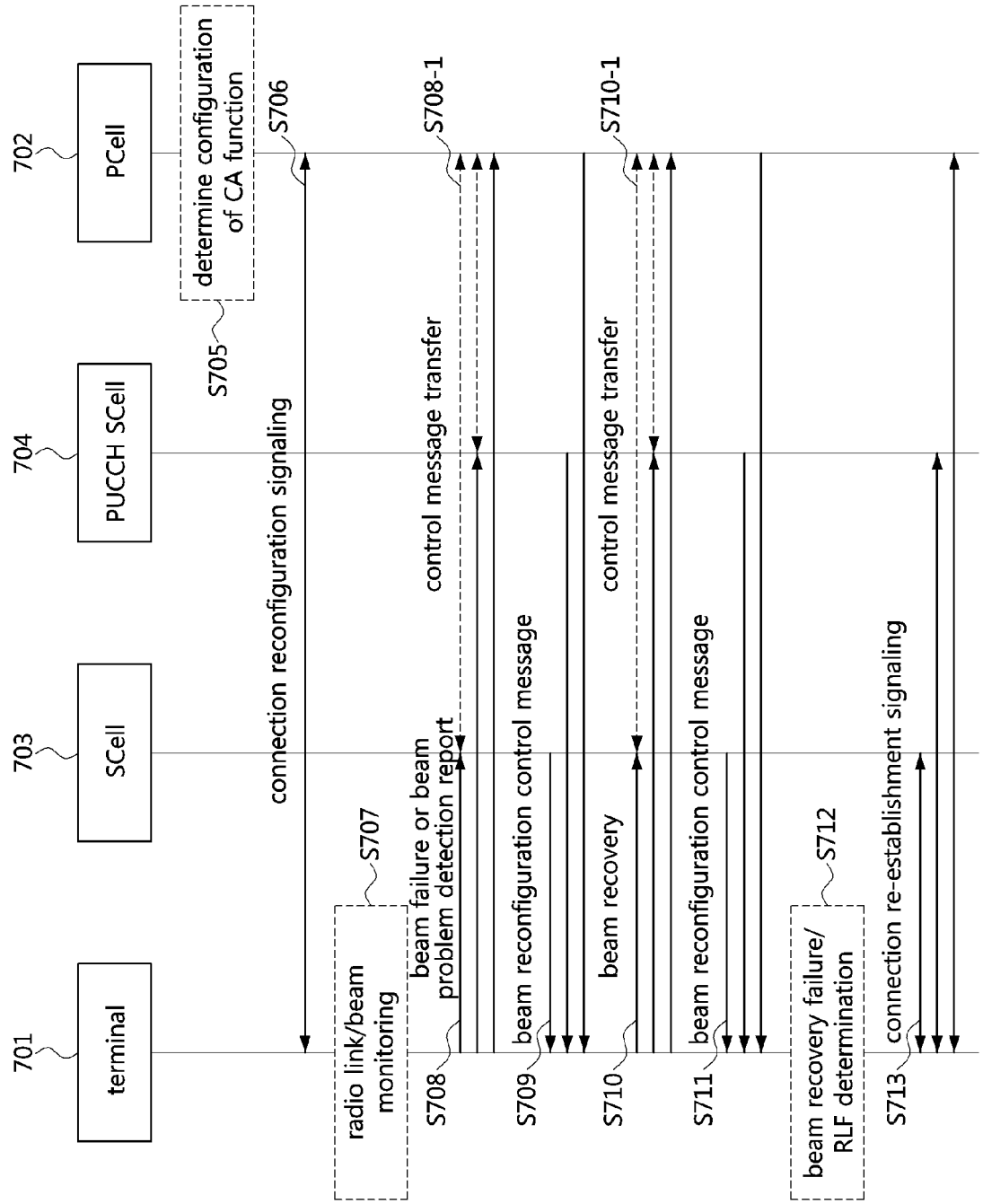
FIG. 7 is a sequence chart for explaining a radio link management method in a carrier aggregation environment according to an exemplary embodiment of the present invention.

FIG. 7 is a sequence chart for explaining a radio link management method in a carrier aggregation environment according to an exemplary embodiment of the present invention.

Referring to FIG. 7, the base station 702 (i.e., primary cell) may determine support of the CA function for the terminal 701 (S705). The base station 702 may operate as a primary cell and exchange signaling messages for connection reconfiguration for configuring the CA function, which include configuration information on a secondary cell 703 or 704, with the terminal 701 (S706). In the step S706, the primary cell 702 may transmit, to the terminal 701, a connection reconfiguration message (i.e., RRC connection reconfiguration message) including control parameters for supporting the CA function. In the step S706, the above-described non-contention-based random access preamble for the beam failure or beam problem detection report or for the beam recovery may be configured for one or more BWPs or active BWPs configured in the terminal in units of a cell supporting the CA function.

The terminal 701 receiving the connection reconfiguration message including the CA configuration parameters for the secondary cell 703 or 704 from the primary cell may transmit a connection reconfiguration complete message (e.g., RRC connection reconfiguration complete message) notifying the successful reception of the corresponding control message to the primary cell 702. Meanwhile, when the secondary cells are configured on an SCell group basis, the secondary cell 704 may mean an SCell (i.e., PUCCH SCell) capable of transmitting PUCCHs among the SCells constituting the SCell group. That the SCells are configured on a group basis may mean that the same parameters may be applied to the SCells belonging to the corresponding SCell group.

After completing the configuration of the CA function through the signaling procedure of the step S706, the terminal may perform beam and radio link monitoring operations for the PCell 702 and the SCells 703 and 704 (S707). In this case, the beam failure detection and beam recovery operation methods described above may be applied to a basic beam management operation in each cell. That is, the beam management operation of the terminal may be independently performed with respect to the PCell or SCell according to the method described above.

In addition to the independent beam management operation, cells supporting the CA function may be controlled to perform an additional operation for the beam management operation of the SCell. For example, when a beam problem or failure of the SCell is detected according to the beam management operation, the terminal 701 may report the beam failure or beam problem for the SCell, or may request a beam recovery procedure, or may report that the beam recovery procedure has been performed or completed to the PCell or PUCCH SCell before performing the beam failure declaration or the beam recovery operation or independently of performing the operation (S708). In this case, information on a time elapsed from when the beam failure detection is recognized or information on a time elapsed from the beam problem/failure detection to the beam recovery completion may be transmitted together with information for identifying the corresponding beam of the SCell by applying the above-described configuration parameters. Here, the information for beam identification may be a TCI state ID or a reference signal (e.g., SSB, CSI-RS, etc.) identifier for beam monitoring.

The reporting of the beam problem or failure detection, the beam recovery request reporting, or the beam recovery completion reporting in the step S708 may be independently performed by the terminal 701 to each of the cells 702, 703, or 704 supporting the CA function. Also, the SCell 703 or 704 that receives a control message informing the beam problem or failure detection report, the beam recovery request report, or the beam recovery completion report from the terminal 701 may transfer the relevant information to the PCell 702 (S708-1). The control message of the step 708-1 may be transferred using a base station internal control message, a control message between base stations, or a control message between functional nodes (e.g., DU or CU of FIG. 4) constituting a base station (or cell).

The cell 702, 703, or 704 that receives the control message informing the beam problem or failure detection report, the beam recovery request report, or the beam recovery completion report from the terminal 701 may transmit a response message for the message of the step S708 to the terminal 701 (S709). The control message of the step S709 may refer to a control message including beam reconfiguration information or indicating beam reconfiguration. Such the control message may be transmitted using a MAC layer control message, an RRC layer control message, or a physical layer control channel. Here, the message including the beam reconfiguration information or indicating the beam reconfiguration may be composed of one or more of information indicating a change to another beam, information indicating a newly activated beam, information for configuring a new beam, or information indicating a change of an active BWP.

On the other hand, after performing the step S708 or without performing the step S708, the terminal 701 may transmit a control message for beam recovery (e.g., random access preamble or message requesting beam change) to perform a beam recovery procedure for the cell in which the beam failure or beam problem is detected (S710).

That is, the terminal 701 may report the beam problem or beam failure detection, request the beam recovery procedure, or perform the beam recovery procedure by performing only one of the steps S708 and S710 described above.

In the step S710, the RA preamble transmitted by the terminal for beam recovery may be transmitted to the cell (SCell) in which the beam failure or beam problem has been detected or transmitted to the PCell (or a cell in which the RA preamble resource is configured). In addition, the 'control message for requesting beam change' using the control message of the MAC layer, the control message of the RRC layer, or the physical layer control channel described above may be transmitted to the cell in which a beam failure or beam problem is not detected and uplink transmission is possible (e.g., PCell or PUCCH SCell) or the SCell in which the aforementioned random access is successful.

The SCell 703 or 704 receiving the control message for beam recovery (e.g., random access preamble or message for requesting beam change) from the terminal 701 may transfer relevant information to the PCell 702 (S710-1). The control message of the step S710-1 may be delivered using a base station internal control message, a control message between base stations, or a control message between functional nodes constituting a base station (or cell).

The cell 702, 703, or 704 that receives the control message for beam recovery from the terminal 701 may transmit a response message for the message of the step S710 to the terminal 701 (S711). The cell performing the step S711 may be different according to the following cases.

Case1: When the PCell 702 or the PUCCH SCell 704 performs the step S711
   Case where the terminal performs the step S708 and/or S709 with the PCell (or PUCCH SCell), and the PCell (or PUCCH SCell) transmits a response message Case2: When the SCell 703 performs the step S711
   Case where the terminal performs the step S708 and/or S709 with the SCell
   Case where the terminal performs the step S708 and/or S709 with the PCell (or PUCCH SCell), and the PCell (or PUCCH SCell) transfers the corresponding information to the SCell The control message of the step S711 may refer to a control message including beam reconfiguration information or indicating beam reconfiguration. The control message of the step S711 may be transmitted using a control message of the MAC layer, a control message of the RRC layer, or a physical layer control channel including the beam reconfiguration information, or using a random access response message. Here, the message including the beam reconfiguration information or indicating the beam reconfiguration may be composed of one or more of information indicating a change to another beam, information indicating a newly activated beam, information for configuring a new beam, or information indicating a change of an active BWP.

In performing the steps S708 to S711, the terminal 701 may perform only one step into which the step S708 and the step S710 are integrated to report the detection of the beam problem or beam failure, to request the beam recovery, or to perform the beam recovery procedure. In this case, the base station 702, 703, or 704 may transmit a control message for beam recovery or reconfiguration to the terminal 701 by performing only one step into which the step S709 and the step S711 are integrated. The control message for beam recovery or reconfiguration transmitted by the base station to the terminal may be transmitted using a MAC layer control message, an RRC layer control message, or a physical layer control channel as described in the step S709 or S711, and the corresponding control message may be information indicating a TCI state ID, a CSI-RS index, or an SSB index, or information (or indicator) indicating activation for the corresponding beam.

In case that the PCell 702 transmits such the control message, the control message may include information on an identifier(s) of SCell and/or BWP which is a beam recovery or beam reconfiguration target.

The terminal 701, which has performed the reporting of the beam failure or the beam recovery operation through the step S708 and/or the step S710, may determine whether the recovery has failed (or succeeded) according to a result of the control message reception operation of the step S709 and/or the step S711 from the cell 702, 703, or 704 (S712). Upon detecting or determining the beam recovery failure or the radio link failure in the step S712, the terminal 701 may transmit a control message for connection re-establishment to the cell 702, 703, or 704 (S713).

When the terminal performs a non-contention-based RA procedure to perform the step S708 or S710, the terminal may notify the beam failure detection or the beam recovery failure, or perform the beam recovery operation through a non-contention-based RA resource configured in the step S706 for the corresponding cell.

When the terminal performs a contention-based random access procedure to perform the step S708 or step S710, the terminal may give priority to a contention-based RA resource of the PCell. Alternatively, when the RA resource is not configured in the uplink active BWP, the terminal may perform the RA procedure by giving priority to a contention-based RA resource of the cell configured as the initial BWP.

In the CA function supporting environment, the terminal 701 and the base stations 702, 703, or 704 may not necessarily perform all the steps described in FIG. 7 for the beam management and beam recovery. In particular, each step from S708 to S713 may be selectively performed. For example, depending on the configuration of the system or the base station, the capability of the terminal, or the service situation, each step of the steps S708 to S713 may be selectively performed to perform operations and signaling procedures for the beam management and the beam recovery.

In addition to the method or procedure using FIG. 7, after detecting the beam failure for the SCell, the terminal may start a timer (e.g., the above-described beam recovery timer ($T_{BR}$) or an additional timer (e.g., timer for SCell beam recovery timer ($T_{S-BR}$)) for performing the beam recovery operation for the SCell, and perform the beam recovery operation before the corresponding timer expires. Alternatively, the terminal may transmit a control message informing relevant information to the PCell when the beam failure is declared after performing the beam recovery operation for the SCell.

In the above-described procedure, the control message transmitted by the terminal to the SCell, the PUCCH SCell, or the PCell for notification of the beam failure detection or beam recovery failure of the SCell or for the beam recovery may be transmitted through an uplink physical layer channel, a MAC control element (CE), or an RRC control message.

When the terminal transmits the uplink physical layer channel to the SCell, the PUCCH SCell, or the PCell for notification of the beam failure detection or beam recovery failure of the SCell or for the beam recovery, the terminal may transmit a control field of the uplink physical layer channel using the uplink active BWP. Alternatively, an additional physical layer signal configured for the beam recovery may be transmitted or a random access procedure may be performed.

For such the beam recovery operation, the base station (SCell, PUCCH SCell, or PCell) may transfer, to the terminal, configuration information such as parameters configuring the above-described RA resource, the physical layer signal for beam recovery, or the control field in the PUCCH through the connection reconfiguration (e.g., RRC connection reconfiguration) message (the step S706 of FIG. 7) for supporting CA functions. In this case, the parameters such as the RA resource for beam recovery, the physical layer signal for beam recovery, or the control field in the PUCCH may be configured on a SCell, SCell group, or beam basis for one or more BWPs configured in the terminal or the active BWP. Here, being configured on a beam basis may mean that it is configured in association with a reference signal identifier (e.g., an index of CSI-RS or SSB) for beam measurement (or beam monitoring) or a TCI state ID.

Accordingly, when the beam failure detection occurs in a certain SCell, the terminal may transmit, for the beam recovery, the above-described RA resource or the physical layer signal, which is configured on an SCell, SCell group, or beam basis, to the SCell, PUCCH SCell, or PCell, or transmit the control field in the PUCCH to the PCell or PUCCH SCell, so that the PCell or PUCCH SCell can identify the SCell and the serving beam (or active beam) that is the target of beam recovery.

In the method in which the terminal transmit the MAC CE (or MAC control PDU) or the RRC control message (e.g., beam recovery failure report message, radio link failure (RLF) report message, radio link re-establishment request message, or the like) to the SCell, PUCCH SCell, or PCell for notification of the beam failure detection or the beam recovery failure, or for the beam recovery (BFR), the corresponding control message may be transmitted as including at least one of the following information or information obtained by conditionally combining at least one of the following information.

Identifier (or index) of the cell where the beam failure detection or the beam recovery procedure is performed or the cell where the RLF occurs Frequency information of the cell where the beam failure detection or the beam recovery procedure is performed or the cell where the RLF occurs Identifier (or index) of the BWP where the beam failure detection or the beam recovery procedure is performed or the BWP where the RLF occurs Identifier (or index) of the BWP where the beam failure detection or the beam recovery procedure is performed or the BWP where the RLF occurs, information for identifying a target beam or candidate beam of the beam recovery (or, reconfiguration) (e.g., TCI state ID, CSI-RS index, or SSB index)

Identifier (or index) of the BWP where the beam failure detection or the beam recovery procedure is performed or the BWP where the RLF occurs, beam measurement result information (e.g., SINR, SNR, RSRP, RSRQ, path loss measurement value, etc.)

Measurement result information (e.g., SINR, SNR, RSRP, RSRQ, path loss measurement value, etc.) of a candidate beam Information on whether the condition for performing non-contention-based random access is satisfied Time point at which the beam failure detection or the radio link failure is recognized Information on a time elapsed after a time point at which the beam recovery procedure is initiated or beam failure detection (BFD) occurs, or information on the corresponding time point Location information of the corresponding terminal at the time of occurrence of beam failure detection (BFD), radio link failure, or the like, or at the time at which the corresponding control message is generated and transmitted (here, the location information may be geolocation information, such as latitude or longitude, or measurement result information from which the location can be estimated)

For the 'location information' transmitted by the terminal, the base station may transmit control information including at least one or conditionally combined information from the following information to the terminal using system information or a separate control message.

Timing information for location information measurement (or estimation)

Reference value for reporting measurement results

A range of measurement result values and an index corresponding to each range of the measurement result values Reference value for reporting geolocation information (e.g. latitude/longitude, GPS information, or terminal built-in positioning sensor information)

Fluctuation width (or fluctuation range) of the geolocation information and index information corresponding thereto Also, when transmitting the location information corresponding to any one of the expressions as described above, the terminal may transmit the location information to the base station in form of at least one or conditionally combined information from the following information.

Information indicating whether the configured reference value is satisfied

Measurement result information

A range of measurement result values and an index corresponding to each range of the measurement result values Geolocation information Fluctuation width (or fluctuation range) of the geolocation information and index information corresponding thereto In addition, the terminal may transmit control information for requesting deactivation of the corresponding cell to the SCell, PUCCH SCell, or PCell. In addition, when the terminal transmits the beam failure detection or beam recovery failure report, the beam recovery request, the radio link failure (RLF) report, or the radio link re-establishment request message through a MAC CE (or MAC control PDU) or an RRC control message, a logical channel identifier (LCID) for transmitting the control message may be designated. That is, by using only the LCID of the MAC header (or subheader) of the MAC layer control message, it may be identified that the corresponding MAC CE is control information informing the beam failure detection or the beam recovery failure, or control information informing the beam recovery, the beam recovery request, or the radio link failure report. In addition, when the MAC CE is configured to include the control parameter information described above, the corresponding control parameter or message may be configured to be distinguished using field information of the MAC subheader.

In case that the terminal transmits control information such as the beam failure detection, the beam recovery failure report, or the radio link failure (RLF) report of the SCell through an uplink physical layer control channel (PUCCH) or a PUSCH using a PUCCH format, indication information indicating that the corresponding situation has occurred, the identifier (or index) of the corresponding cell, the BWP identifier information, or the like may be transmitted. In this case, transmitting through the PUSCH using a PUCCH format may mean transmitting the control information in a form that can be directly recognized by the physical layer of the receiving side without involvement of the MAC layer (that is, without MAC (sub)header). When the control information is transmitted through the PUCCH, the control information may be transmitted to the PUCCH SCell or the PCell, and a dedicated PUCCH resource may be allocated for this purpose. That is, the corresponding control information may be transmitted using the PUCCH resource allocated exclusively for the beam failure detection, the beam recovery failure report, or the radio link failure (RLF) report of the SCell. If there is no pre-allocated resource or no available PUCCH resource, the corresponding control information may be transmitted through a random access procedure. When a non-contention-based random access procedure is performed, the corresponding control information may be transmitted in form of a MAC CE or an RRC control message described above through an uplink resource scheduled first in the random access procedure. On the other hand, when a contention-based random access procedure is performed, after completion of the random access procedure, the corresponding control information may be transmitted in form of a MAC CE or an RRC control message described above after completion of the random access procedure.

The PCell, that has been reported the beam failure detection or beam recovery failure or received control information requesting deactivation of the corresponding cell through the SCell or PUCCH SCell or from the terminal, may deactivate the corresponding SCell and transmit to the SCell and/or the terminal a control message informing that the SCell has been deactivated.

In addition, the SCell, PUCCH SCell, or PCell receiving the control message of the above-described uplink physical layer channel (e.g., PUCCH, PRACH, or PUSCH) from the terminal for beam recovery of the PCell or SCell may activate the corresponding SCell in case of successfully finishing the beam recovery procedure, and transmit, to the terminal, control information informing activation of the recovered beam by using a downlink physical layer control channel (e.g., PDCCH) or a MAC CE of the SCell, PUCCH SCell, or PCell. In this case, the SCell, PUCCH SCell, or PCell may transmit control information informing activation of one or more TCI state IDs to the terminal in form of a DCI or a UCI in the PDCCH or a MAC CE. In addition, if necessary, the SCell, PUCCH SCell, or PCell may transmit, to the terminal, an RRC control message for reconfiguring the configured TCI state information or reconfiguring configuration information of parameters for beam management or beam recovery. In addition, when using cross-carrier scheduling to transmit a response message for the beam recovery from the terminal or to start downlink channel transmission after the beam recovery, the base station (SCell, PUCCH SCell, or PCell) may transmit an identifier of the corresponding cell and information for identifying the activated beam. The cell identifier or the beam identification information may be a TCI state ID, a CSI-RS index, an SSB index, or the like, and may be transmitted to the terminal through a PDCCH or a PDSCH.

When the terminal detects a beam satisfying the beam recovery (or configuration) condition by monitoring (or measuring) beams of the SCell in the beam recovery procedure after the beam failure detection, the terminal may perform an RA operation to the SCell by using a random access (RA) preamble resource corresponding to the beam. In this case, the random access procedure may use the contention-free random access or the contention-based random access procedure.

When the terminal attempts the non-contention-based random access procedure for beam recovery after the beam failure detection of the SCell and fails the non-contention-based random access procedure, or when the reference condition for the non-contention-based random access is not satisfied, the terminal may be controlled to perform a contention-based random access procedure to the SCell or PCell. That is, when a reference signal reception strength of the corresponding beam is greater than or equal to a reference value, the non-contention-based random access procedure may be performed, and when less than the reference value, the execution of the non-contention-based random access procedure may be restricted.

Here, the received signal strength of the reference signal used as the reference value for performing the non-contention-based random access may be represented by RSSI, SNR, RSRP, RSRQ, or the like of the corresponding reference signal (e.g., CSI-RS or synchronization signal and PBCH block (SSB)).

In addition, a timer (e.g., Timer_X) that specifies a duration in which the non-contention-based random access procedure for beam recovery can be performed may be configured, and the terminal may be configured to perform a contention-based random access procedure when the non-contention-based random access procedure is not successfully completed until the corresponding timer expires.

Also, when the terminal performs the contention-based random access procedure for beam recovery, the terminal may transmit control information including at least one of an identifier of the cell in which the beam failure detection or beam recovery procedure described above is performed, information for identifying the corresponding beam, measurement result information of the corresponding beam, measurement result information of the candidate beam, information on whether or not the condition for performing the non-contention-based random access is satisfied, control information requesting deactivation of the corresponding cell, information on a time elapsed from a time point at which the beam failure detection is recognized (or a time point of starting the beam recovery), or information of the corresponding time point. The candidate beam may refer to a beam which is not configured the corresponding terminal, but its measurement result satisfies the preconfigured condition (e.g., a beam whose measurement result such as RSRP, RSRQ, SINR, etc. is equal to or greater than the reference condition) as well as a beam configured and deactivated for the corresponding terminal.

If the SCell is deactivated during the CA function support, the parameters configured for the radio link or beam management operation for the corresponding SCell may be released, stopped, or reset. In addition, a timer (or a counter value of a timer) configured for the radio link or beam management operation may be stopped or suspended, or reset to an initial value, so that the operation (e.g., timer running operation) of the timer is controlled to be stopped.

If the SCell has been deactivated due to the beam failure detection, when the beam recovery for the SCell is completed according to the above description, the SCell may be activated. If the beam recovery completion is not according to the RA procedure by the terminal to the SCell or transmission of control information for beam recovery by the terminal, but according to a result of beam monitoring (or measuring) of the SCell, the terminal may report the completion of beam recovery for the SCell to the PCell or the SCell. The control message informing the completion of beam recovery for the SCell may be configured in form of a MAC CE, and may be transmitted through an uplink message (e.g., MSG3 in the RA procedure) transmitted first after transmission of the RA preamble (PRACH) for random access.

The PCell that receives the control message indicating the completion of beam recovery for the SCell from the terminal may activate the corresponding SCell, and transmit control information on the activation to the SCell and/or the terminal.

When the bandwidth part (BWP) scheme introduced in the NR system is applied to the PCell or the SCell, the following method should be additionally considered in performing the random access (RA) operation for beam recovery.

The terminal may transmit a non-contention-based PRACH through an uplink BWP in which a non-contention-based RA resource allocated in advance is configured. A response message (e.g., RA Response (RAR)) for the PRACH transmitted for beam recovery may be received through a downlink (DL) BWP corresponding to an uplink (UL) BWP through the PRACH is transmitted (e.g., DL BWP whose identifier is identical to that of the corresponding UL BWP) or an initial DL BWP.

Upon receiving the PRACH for beam recovery from the terminal, the PCell or the SCell may transmit an identifier of an active BWP, an active TCI state ID, information requesting a measurement report, or the like to the terminal together with the received PRACH index through a random access response (RAR) message or a PDCCH. In this case, the identifier of the active BWP may be downlink and/or uplink BWP identifiers. Also, the information requesting the measurement report may be composed of one or more bits. When the information is composed of a single bit, this means an indicator requesting a measurement result for the configured reference signal identifier, TCI state ID, and the like. When the information is composed of a plurality of bits, the corresponding bit information may indicate a reference signal identifier, a TCI state ID, or a preconfigured measurement target ID, which is a measurement target.

The terminal receiving the RAR message or the related PDCCH control field for the PRACH transmitted for beam recovery from the PCell or the SCell may receive necessary information by monitoring a downlink channel in the downlink BWP, and may perform an uplink transmission operation in the uplink BWP according to the received active BWP ID. In addition, when the measurement result report is requested, the terminal may transmit the measurement result for the measurement target to the PCell or SCell.

When the non-contention-based RA operation performed for beam recovery fails or does not succeed or when the non-contention-based RA for beam recovery is not configured, the terminal may perform a contention-based RA operation procedure for beam recovery of the SCell.

When the contention-based RA operation procedure is performed for beam recovery, the terminal may transmit a contention-based RACH through the active uplink BWP or the configured uplink BWP of the corresponding SCell in which contention-based RA resources are configured. However, when the contention-based RA resources are not configured in the active uplink BWP or uplink BWP configured for the SCell, the terminal may transmit a contention-based PRACH through the configured active uplink BWP, the uplink BWP, or the initial BWP. However, in case that the terminal performs the contention-based random access procedure, priority may be given to the contention-based RA resource of the PCell, or in case that the RA resource is not configured in the uplink active BWP, the terminal may be configured to perform the RA procedure by giving priority to the contention-based RA resource of the cell configured as the initial BWP.

The response message (e.g., RAR message) for the contention-based PRACH transmitted for beam recovery may be received through a downlink BWP corresponding to the uplink BWP through which the PRACH is transmitted (e.g., DL BWP having the same identifier for identifying the BWP). Alternatively, the terminal may receive the response message for the PRACH through the initial BWP of the SCell or the PCell.

Upon receiving the PRACH for beam recovery from the terminal, the PCell or the SCell may transmit the RA response message to the terminal. Upon receiving the RA response message, the terminal may notify the beam failure detection or beam recovery, or transmit a control field indicating a beam recovery request, an identifier of the SCell, or beam measurement result together with its own identifier (e.g., C-RNTI). Here, the beam measurement result may include a received signal strength (e.g., information representing RSSI, RSRP, RSRQ, SIR, SNR, etc.) of the corresponding reference signal measured, an identifier of the reference signal, the TCI state ID, or the like. However, the measurement result may be composed of only the reference signal identifier or the TCI state ID without the received signal strength information. In this case, the measurement result may include the reference signal identifiers or the TCI state IDs in the received signal strength order (or reverse order).

In the beam recovery procedure using the random access described above, the terminal may be configured to report only the measurement result received above a preconfigured reference value. In addition, when a related timer (e.g., TBR) expires during the random access procedure for beam recovery, the radio link failure (RRF) due to the beam recovery failure described above may be determined and a radio link re-establishment procedure may be performed. In this case, the terminal may convert the random access procedure in progress for beam recovery into the radio link re-establishment request.

Therefore, during the non-contention-based RA operation, in the MSG3 stage (first uplink transmission after PRACH transmission), the terminal may transmit the radio link re-establishment message, in which the cause of the RLF is set to the beam recovery failure or the beam failure, to the base station.

Also, in case of performing the contention-based RA operation, in the MSG5 (i.e., second uplink transmission after PRACH transmission) stage, the terminal may transmit the radio link re-establishment message, in which the cause of the RLF failure is set to the beam recovery failure or beam failure. However, even when performing the contention-based RA operation, in the MSG3 stage, the terminal may be controlled to transmit the radio link re-establishment message, in which the cause of the RLF failure is set to the beam recovery failure or beam failure, together with the identifier of the terminal.

In addition, in performing the non-contention-based RA for beam recovery configured for the terminal, when the non-contention-based RA is not performed because the RSRP (or RSRQ) reference value for the non-contention-based PRACH transmission is not satisfied, the terminal may be controlled to perform a beam recovery operation using contention-based RA resources if a preconfigured timer (e.g., Timer_X described above) expires. Here, not satisfying the RSRP (or RSRQ) reference value means that the signal quality of PRACH for the RA resource configured for beam recovery is lower than the reference value for the contention-free PRACH transmission. However, the signal quality or reference value of the PRACH means the received signal strength of the reference signal (e.g., SSB, CSI-RS, etc.) that can be expressed by the above-described RSSI, SNR, RSRP, or RSRQ.

If necessary, the base station may configure the terminal having not performed the contention-based RA to perform a beam recovery operation by using a contention-based RA resource regardless of the Timer_X operation. In this case, the terminal may perform the beam recovery operation by transmitting a PRACH using a contention-based RA resource according to its own decision or when a preconfigured condition is satisfied.

In addition, when performing the non-contention-based RA procedure configured to the terminal for beam recovery or other purposes, Timer_X may be started (or restarted) at the time when the terminal triggers the non-contention-based RA procedure. Here, Timer_X means a timer configured for the terminal to wait without stopping or canceling the non-contention-based RA procedure until the corresponding Timer_X expires when the reference value for performing the non-contention-based PRACH transmission using the corresponding RA resource is not satisfied. That is, after Timer_X is started (or restarted), the terminal may performing measurement or monitoring on whether the reference signal for measuring the PRACH quality of the non-contention-based RA resource is above (or below) the reference value before the corresponding Timer_X expires. In addition, if the reference value condition of the PRACH quality is not satisfied, the terminal may not perform the non-contention-based RA operation and may not switch to the contention-based RA procedure until Timer_X expires. If the corresponding Timer_X expires while not satisfying the reference value for the non-contention-based PRACH transmission, the terminal may transmit the contention-based PRACH by switching to the contention-based RA procedure or by changing to another BWP.

In addition to the above-described operation or procedure for beam failure detection or beam recovery, a signaling (e.g., polling or probing) procedure for estimating a beam state and determining whether packet transmission and reception are possible may be performed between the terminal and the base station (serving cell (or node) such as SCell, PUCCH SCell, or PCell).

Figure 8:
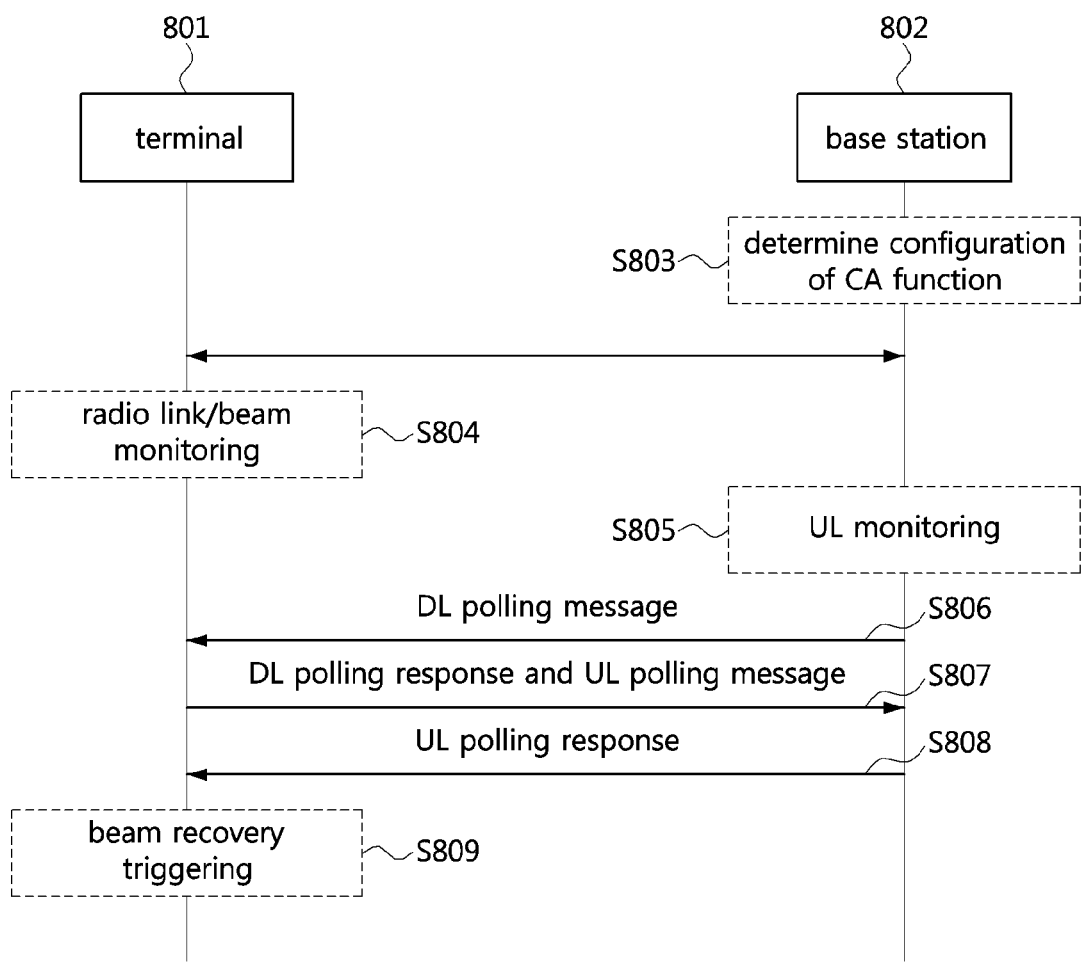
FIG. 8 is a sequence chart for explaining a radio link management method in a carrier aggregation environment according to another exemplary embodiment of the present invention.

FIG. 8 is a sequence chart for explaining a radio link management method in a carrier aggregation environment according to another exemplary embodiment of the present invention.

In FIG. 8, for convenience of description, an operation of a single cell of the base station 802 and the terminal 801 is described. However, the operation of the base station 802 and the terminal 801 to be described later may also be applied to a carrier aggregation environment where a plurality of cells (carriers) are aggregated.

The base station 802 may configure a first cell and configure a connection between the first cell and the terminal 801 to provide services (S803). In this case, when the carrier aggregation function is applied, the terminal 801 may receive configuration information on one or more secondary cells (e.g., the second cell) from the primary cell (e.g., the first cell) to perform the carrier aggregation function.

The terminal 801 may perform a monitoring operation on the beam using a reference signal of a downlink channel of the first cell and perform a reception operation on the downlink channel (S804). In addition, the base station 802 may perform beam monitoring using a reference signal of an uplink channel from the terminal 801 through the first cell, and perform a reception operation on the uplink channel (S804).

The terminal 801 may monitor the signal quality of the downlink channel through the operation of the step S804, and monitor whether downlink feedback information (e.g., HARQ ACK/NACK or other control signal) or a physical layer control channel (PDCCH) for its uplink transmission is received from the first cell while satisfying a preconfigured condition. Also, the base station 802 may monitor the signal quality of the uplink channel from the terminal through the operation of the step S805, and may monitor whether uplink feedback information (e.g., HARQ ACK/NACK) or other control signal) or a physical layer control channel (PUCCH) for the downlink transmission through the first cell is received from the terminal while satisfying a preconfigured condition.

When a result of performing the step S804 or S805 does not meet the preconfigured condition, the base station 802 or the terminal 801 may independently transmit a polling message. Here, the polling message may be transmitted as configured in a control field (or bit) of a physical layer control channel (e.g., PDCCH or PUCCH) or in form of a MAC CE.

For example, the base station 802 may determine to transmit a DL polling message through the step S805. In the step S805, the base station 802 may start a timer (e.g., DL_POLL_TIMER) for a polling operation, and generate and transmit a DL polling message through the first cell (S806). The terminal 801 receiving the DL polling message of the step S806 may transmit a DL polling response message or generate and transmit a UL polling message (S807).

Before the DL_POLL_TIMER started in the step S805 expires, if the base station 802 receives the DL polling response message or the UL polling message from the terminal 801 through the first cell, the base station 802 may determine that the corresponding beam (or radio link) is valid, and continue services using the corresponding beam (or radio link). On the other hand, if the DL polling response message or the UL polling message is not received from the terminal 801 through the first cell and the DL_POLL_TIMER expires, the base station 802 may declare a beam (or radio link) failure between the first cell and the terminal, and trigger a beam recovery procedure or stop the downlink transmission for a preconfigured time interval (or timer). In addition, when the CA function is configured, the base station may deactivate the first cell.

In addition, in response to the DL polling message in the step S806, the terminal 801 may transmit a DL polling response message, or generate a UL polling message and transmit the UL polling message to the base station 802 through the first cell (S807). That is, even when there is not the step S806, the terminal may trigger the UL polling message transmission based on the result of the step S804. The terminal 801 that triggers the UL polling message transmission may start UL_POLL_TIMER and generate and transmit the UL polling message.

The base station 802 receiving the UL polling message from the terminal 801 through the first cell may transmit a UL polling response message (S808). If the base station 802 receives the UL polling message of the step S807 without the step S806, the base station 802 may generate and transmit a DL polling message in response to the UL polling instead of the UL polling response message.

When the UL polling response message or the UL polling message is received from the base station 802 through the first cell before the UL_POLL_TIMER started in the step S807 expires, the terminal 801 may determines that a beam (or radio link) between the first cell and the terminal is valid, and continue services by using the corresponding beam (or radio link).

However, when the UL polling response message or the DL polling message from the base station 802 is not received through the first cell and UL_POLL_TIMER expires, the terminal 801 may declare a beam (or radio link) failure between the terminal and the first cell, and trigger a beam recovery procedure or stop uplink transmission for a pre-configured time interval (or timer) (S809). In addition, when the CA function is configured, the terminal 801 may report the beam failure for the first cell or request deactivation of the first cell through another serving cell (e.g., the second cell).

The polling response message described above may be transmitted as configured in a control field (or bit) of a physical layer control channel (e.g., PDCCH or PUCCH) or in form of a MAC CE.

The configuration parameter information on the timer value, the reference value, or the conditions required in the operation or procedure for beam failure detection or beam recovery described above may be transmitted by the base station to the terminal through system information or a separate control message.

In addition, in the above description, the operation of the base station (or cell) may be an operation performed by a node such as CU or DU described with reference to FIG. 4 when the functional split function is applied.

With respect to the operation of the timer defined or described in the present invention, although operations such as start, stop, reset, restart, or expire of the defined timer are not separately described, they mean or include the operations of the corresponding timer or a counter for the corresponding timer.

The cell (or base station) of the present invention may refer to a road side unit (RSU), a radio remote head (RRH), a transmission point (TP), a transmission and reception point (TRP), or a gNB, in addition to the NodeB, the evolved NodeB, the base transceiver station (BTS), the radio base station, the radio transceiver, the access point, or the access node as the base station described in FIG. 1. It may also be referred to as a CU node or a DU node according to application of the functional split described in FIG. 4.

Also, the terminal of the present invention may refer to an Internet of Thing (IoT) device, a mounted module/device/terminal, or an on board device/terminal, in addition to the terminal, the access terminal, the mobile terminal, the station, the subscriber station, the mobile station, the mobile subscriber station, the node, or the device as the UE described in FIG. 1.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a terminal for beam management and radio link management, the operation method comprising:
receiving, from a first cell operating as a primary cell (PCell), a connection reconfiguration message for configuring a carrier aggregation function including configuration information for a second cell operating as a secondary cell (SCell);

performing beam monitoring operations for the first cell and the second cell and a radio link monitoring operation for the first cell;

in response to detecting a beam failure for the second cell, performing a procedure of a beam failure recovery for the second cell, and reporting the beam failure recovery to the first cell or the second cell; and in response to detecting a radio link failure (RLF) for the first cell, re-establishing a radio link with a third cell, and performing a procedure of reporting the RLF to the third cell, wherein the procedure of reporting the RLF to the third cell includes transmitting a RLF message to the third cell, the RLF message including an identifier of the first cell where the RLF occurred, location information of the terminal at a time of transmitting the RLF message, and information on a time elapsed after the occurrence of the RLF, wherein the RLF message further includes information on whether a condition for performing a random access procedure for beam recovery is satisfied.

2. The operation method of claim 1,
wherein the RLF message is a radio resource control (RRC) layer message.

3. The operation method of claim 1,
wherein the random access procedure is a non-contention-based random access procedure.

4. The operation method of claim 1,
wherein the location information includes a latitude and/or a longitude of the terminal.

5. The operation method of claim 1,
wherein the procedure of reporting the beam failure recovery to the first cell includes transmitting a medium access control (MAC) message including at least one of information for identifying a failed beam, information on a time elapsed from the detection of the beam failure, and information on a time elapsed from the detection of the beam failure to completion of the beam failure recovery.

6. The operation method of claim 5,
wherein the information of identifying the failed beam is a transmission configuration indicator (TCI) state identifier or an identifier of a reference signal for beam monitoring.

7. The operation method of claim 5,
wherein the MAC message is a MAC control element (CE) message.

8. An operation method of a base station operating a first cell and a second cell, the first cell being a primary cell (PCell), and the operation method comprising:

transmitting, to a terminal, a connection reconfiguration message for configuring a carrier aggregation function including configuration information on the second cell operating as a secondary cell (SCell);

in response to detecting a beam failure for the second cell at the terminal, performing a procedure of receiving a report of a beam failure recovery from the terminal via the first cell or the second cell, the beam failure recovery being performed by the terminal for the second cell; and in response to detecting a radio link failure (RLF) for the first cell at the terminal, performing a procedure of receiving a report of the RLF from the terminal via a third cell, wherein the procedure of receiving the report of the RLF includes receiving a RLF message from the terminal via the third cell, the RLF message including an identifier of the first cell where the RLF occurred, location information of the terminal at a time of transmitting the RLF message, and information on a time elapsed after the occurrence of the RLF, wherein the RLF message further includes information on whether a condition for performing a random access procedure for beam recovery is satisfied.

9. The operation method of claim 8,
wherein the RLF message is a radio resource control (RRC) layer message.

10. The operation method of claim 8,
wherein the random access procedure is a non-contention-based random access procedure.

11. The operation method of claim 8,
wherein the location information includes a latitude and/or a longitude of the terminal.

12. The operation method of claim 8,
wherein the procedure of receiving the report of the beam failure recovery includes receiving a medium access control (MAC) message including at least one of information for identifying a failed beam, information on a time elapsed from the detection of the beam failure, and information on a time elapsed from the detection of the beam failure to completion of the beam failure recovery.

13. The operation method of claim 12,
wherein the information of identifying the failed beam is a transmission configuration indicator (TCI) state identifier or an identifier of a reference signal for beam monitoring.

14. The operation method of claim 12,
wherein the MAC message is a MAC control element (CE) message.

* * * * *